United States Patent
Schumacher et al.

(10) Patent No.: US 11,203,262 B2
(45) Date of Patent: Dec. 21, 2021

(54) TRANSPORT CLIMATE CONTROL SYSTEM WITH AN ACCESSORY POWER DISTRIBUTION UNIT FOR MANAGING TRANSPORT CLIMATE CONTROL LOADS

(71) Applicant: THERMO KING CORPORATION, Minneapolis, MN (US)

(72) Inventors: Ryan Wayne Schumacher, Bloomington, MN (US); Nicholas Allan Cregan, Roseville, MN (US); Mark D. Leasure, Eagan, MN (US); Michael James Vanous, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 140 days.

(21) Appl. No.: 16/565,205

(22) Filed: Sep. 9, 2019

(65) Prior Publication Data

US 2021/0070138 A1    Mar. 11, 2021

(51) Int. Cl.
*B60L 1/00* (2006.01)
*B60L 1/02* (2006.01)
(Continued)

(52) U.S. Cl.
CPC .............. *B60L 1/02* (2013.01); *B60R 16/033* (2013.01); *B60H 1/00428* (2013.01);
(Continued)

(58) Field of Classification Search
CPC ............. B60R 16/03–033; B60L 1/003; B60L 1/02–12; B60P 3/20–205; H02J 2310/40–48
See application file for complete search history.

(56) References Cited

U.S. PATENT DOCUMENTS 3,875,483 A    4/1975 Farr
5,104,037 A    4/1992 Karg et al.
(Continued)

FOREIGN PATENT DOCUMENTS

CN    2456117    10/2001
CN    1885660    12/2006
(Continued)

OTHER PUBLICATIONS

Extended European Search Report, issued in the corresponding European patent application No. 20195240.5, dated Feb. 2, 2021, 10 pages.
(Continued)

*Primary Examiner* — Hal Kaplan
*Assistant Examiner* — David A Shiao
(74) *Attorney, Agent, or Firm* — Hamre, Schumann, Mueller & Larson, P.C.

(57) ABSTRACT

A power distribution unit (PDU) for use with an electrically powered accessory is disclosed. The PDU includes at least one power input configured to receive electrical power from an electrical supply equipment and/or a second power source. The PDU also includes an accessory power interface configured to provide power to the electrically powered accessory. The PDU further includes a vehicle power interface configured to provide power to a vehicle electrical system of the vehicle. Also the PDU includes at least one switch configured to selectively connect the at least one power input to a power bus, and selectively connect the power bus to at least one of the accessory power interface and the vehicle power interface. The PDU also includes a controller configured to control the at least one switch to provide power to the electrically powered accessory and/or the vehicle electrical storage device of the vehicle electrical system.

18 Claims, 13 Drawing Sheets

(51) Int. Cl.
*B60R 16/033* (2006.01)
*B60H 1/00* (2006.01)
*B60H 1/32* (2006.01)
*B60P 3/20* (2006.01)
*H02J 1/08* (2006.01)

(52) U.S. Cl.
CPC .......... *B60H 1/3205* (2013.01); *B60H 1/3226* (2013.01); *B60H 1/3232* (2013.01); *B60L 1/003* (2013.01); *B60P 3/20* (2013.01); *H02J 1/084* (2020.01); *H02J 2310/40* (2020.01); *H02J 2310/60* (2020.01)

(56) References Cited

U.S. PATENT DOCUMENTS

| | | | |
|---|---|---|---|
| 5,231,849 A | 8/1993 | Rosenblatt | |
| 6,034,445 A * | 3/2000 | Hewitt | B60H 1/00364 307/80 |
| 6,280,320 B1 | 8/2001 | Paschke et al. | |
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,652,330 B1 | 11/2003 | Wasilewski | |
| 6,688,125 B2 | 2/2004 | Okamoto et al. | |
| 6,753,692 B2 | 6/2004 | Toyomura et al. | |
| 6,925,826 B2 | 8/2005 | Hille et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,134,339 B2 | 3/2012 | Burlak et al. | |
| 8,170,886 B2 | 5/2012 | Luff | |
| 8,214,141 B2 | 7/2012 | Froeberg | |
| 8,295,950 B1 * | 10/2012 | Wordsworth | B60H 1/323 700/22 |
| 8,381,540 B2 | 2/2013 | Alston | |
| 8,441,228 B2 | 5/2013 | Brabec | |
| 8,476,872 B2 | 7/2013 | Truckenbrod et al. | |
| 8,487,458 B2 | 7/2013 | Steele et al. | |
| 8,541,905 B2 | 9/2013 | Brabec | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,742,620 B1 | 6/2014 | Brennan et al. | |
| 8,760,115 B2 | 6/2014 | Kinser et al. | |
| 8,764,469 B2 | 7/2014 | Lamb | |
| 8,767,379 B2 | 7/2014 | Whitaker | |
| 8,818,588 B2 | 8/2014 | Ambrosio et al. | |
| 8,862,356 B2 | 10/2014 | Miller | |
| 8,912,683 B2 | 12/2014 | Dames et al. | |
| 8,924,057 B2 | 12/2014 | Kinser et al. | |
| 8,978,798 B2 | 5/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabec | |
| 9,147,335 B2 | 9/2015 | Raghunathan et al. | |
| 9,199,543 B2 | 12/2015 | Brabec | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,694,697 B2 | 7/2017 | Brabec | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 | 5/2018 | Weber et al. | |
| 9,987,906 B2 | 6/2018 | Kennedy | |
| 10,000,122 B2 | 6/2018 | Wu et al. | |
| 10,148,212 B2 | 12/2018 | Schumacher et al. | |
| 10,240,847 B1 | 3/2019 | Thomas, Jr. | |
| 2002/0113576 A1 | 8/2002 | Oomura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2003/0201097 A1 | 10/2003 | Zeigler et al. | |
| 2005/0057210 A1 | 3/2005 | Ueda et al. | |
| 2005/0065684 A1 | 3/2005 | Larson et al. | |
| 2006/0284601 A1 | 12/2006 | Salasoo et al. | |
| 2007/0052241 A1 | 3/2007 | Pacy | |
| 2007/0192116 A1 | 8/2007 | Levitt | |
| 2008/0177678 A1 | 7/2008 | Di Martini et al. | |
| 2008/0281473 A1 | 11/2008 | Pitt | |
| 2009/0121798 A1 | 5/2009 | Levinson | |
| 2009/0122901 A1 | 5/2009 | Choi et al. | |
| 2009/0126901 A1 | 5/2009 | Hegar et al. | |
| 2009/0178424 A1 | 7/2009 | Hwang et al. | |
| 2009/0195349 A1 | 8/2009 | Frader-Thompson et al. | |
| 2009/0228155 A1 | 9/2009 | Slifkin et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0118916 A1 | 5/2011 | Gullichsen | |
| 2011/0162395 A1 | 7/2011 | Chakiachvili et al. | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2011/0290893 A1 | 12/2011 | Steinberg | |
| 2012/0000212 A1 | 1/2012 | Sanders et al. | |
| 2012/0116931 A1 | 5/2012 | Meyers | |
| 2012/0153722 A1 | 6/2012 | Nazarian | |
| 2012/0198866 A1 | 8/2012 | Zeidner | |
| 2012/0245772 A1 * | 9/2012 | King | B60W 10/08 701/22 |
| 2012/0310376 A1 | 12/2012 | Krumm et al. | |
| 2012/0310416 A1 | 12/2012 | Tepper et al. | |
| 2013/0000342 A1 | 1/2013 | Blasko et al. | |
| 2013/0073094 A1 | 3/2013 | Knapton et al. | |
| 2013/0088900 A1 | 4/2013 | Park | |
| 2013/0158828 A1 | 6/2013 | McAlister | |
| 2013/0197748 A1 * | 8/2013 | Whitaker | B60L 53/14 701/34.4 |
| 2013/0231808 A1 | 9/2013 | Flath et al. | |
| 2014/0018969 A1 | 1/2014 | Forbes, Jr. | |
| 2014/0020414 A1 | 1/2014 | Rusignuolo et al. | |
| 2014/0026599 A1 | 1/2014 | Rusignuolo et al. | |
| 2014/0060097 A1 | 3/2014 | Perreault | |
| 2014/0137590 A1 | 5/2014 | Chopko et al. | |

(56) References Cited

U.S. PATENT DOCUMENTS

| | | |
|---|---|---|
| 2014/0230470 A1 | 8/2014 | Cook |
| 2014/0265560 A1 | 9/2014 | Leehey et al. |
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0246593 A1 | 9/2015 | Larson et al. |
| 2015/0306937 A1 | 10/2015 | Kitamura et al. |
| 2015/0316301 A1 | 11/2015 | Kolda et al. |
| 2015/0345958 A1 | 12/2015 | Graham |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1* | 12/2017 | Dziuba .................. B62D 59/04 |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1 | 10/2018 | Alahyari et al. |
| 2018/0334012 A1 | 11/2018 | Geller et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1 | 2/2019 | Sufrin-Disler et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1 | 4/2020 | Wenger et al. |
| 2020/0130471 A1 | 4/2020 | Leasure |
| 2020/0130473 A1 | 4/2020 | Schumacher et al. |
| 2020/0136504 A1 | 4/2020 | Schumacher et al. |
| 2020/0207184 A1 | 7/2020 | Schumacher et al. |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |

(56) References Cited

FOREIGN PATENT DOCUMENTS

| WO | 2020068646 | 4/2020 |
|----|------------|--------|
| WO | 2020069107 | 4/2020 |

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

"Lamberet Smart Reefer on Solutrans", ZOEKEN, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System ", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methodsand Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/176,720, titled "Methods and Systems for Augmenting a Vehicle Powered Transport Climate Control System", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/235,865, titled "Methods and Systems for Preserving Autonomous Operation of a Transport Climate Control System", filed Dec. 28, 2018, 41 pages.

PCT International Application No. PCT/US2018/068136, titled "Methods and Systems for Providing Predictive Energy Consumption Feedback for Powering a Transport Climate Control System", filed Dec. 31, 2018, 34 pages.

PCT International Application No. PCT/US2018/068129, titled "Methods and Systems for Notifying and Mitigating a Suboptimal Event Occurring in a Transport Climate Control System", filed Dec. 31, 2018, 44 pages.

PCT International Application No. PCT/US2018/068139, titled "Methods and Systems for Providing Feedback for a Transport Climate Control System", filed Dec. 31, 2018, 37 pages.

PCT International Application No. PCT/US2018/068142, titled "Methods and Systems for Providing Predictive Energy Consumption Feedback for Powering a Transport Climate Control System Using External Data", filed Dec. 31, 2018, 39 pages.

U.S. Appl. No. 16/911,692, titled "Climate Controlled Vehicle, Transport Climate Control Equipment, Method of Retrofitting a Vehicle and Method of Operation", filed Jun. 25, 2020, 39 pages.

U.S. Appl. No. 16/565,110, titled "Transport Climate Control System With a Self-Configuring Matrix Power Converter", filed Sep. 9, 2019, 52 pages.

U.S. Appl. No. 16/565,146, titled "Optimized Power Management for a Transport Climate Control Energy Source", filed Sep. 9, 2019, 53 pages.

US Provisional U.S. Appl. No. 62/897,833, titled "Optimized Power Distribution To Transport Climate Control Systems Amongst One or More Electric Supply Equipment Stations ", filed Sep. 9, 2019, 41 pages.

European Patent Application No. 19382776.3, titled "Mprioritized Power Delivery for Facilitating Transport Climate Control", filed Sep. 9, 2019, 41 pages.

U.S. Appl. No. 16/565,282, titled "Optimized Power Cord for Transferring Power To a Transport Climate Control System ", filed Sep. 9, 2019, 43 pages.

U.S. Appl. No. 16/565,235, titled "Interface System for Connecting a Vehicle and a Transport Climate Control System", filed Sep. 9, 2019, 64 pages.

U.S. Appl. No. 16/565,252, titled "Demand-Side Power Distribution Management For a Plurality of Transport Climate Control Systems", filed Sep. 9, 2019, 44 pages.

U.S. Appl. No. 17/015,190, titled "Optimized Power Distribution To Transport Climate Control Systems Amongst One or More Electric Supply Equipment Stations ", filed Sep. 9, 2020, 43 pages.

U.S. Appl. No. 16/147,708, titled "Methods and Systems for Autonomous Climate Control Optimization of a Transport Vehicle", filed Sep. 29, 2018, 41 pages.

U.S. Appl. No. 16/176,667, titled "Drive Off Protection System and Method for Preventing Drive Off", filed Oct. 31, 2018, 41 pages.

U.S. Appl. No. 16/730,126, titled "Transport Climate Control System Power Architecture", filed Dec. 30, 2019, 27 pages.

U.S. Appl. No. 17/015,194, titled "Prioritized Power Delivery for Facilitating Transport Climate Control", filed Sep. 9, 2020, 41 pages.

* cited by examiner

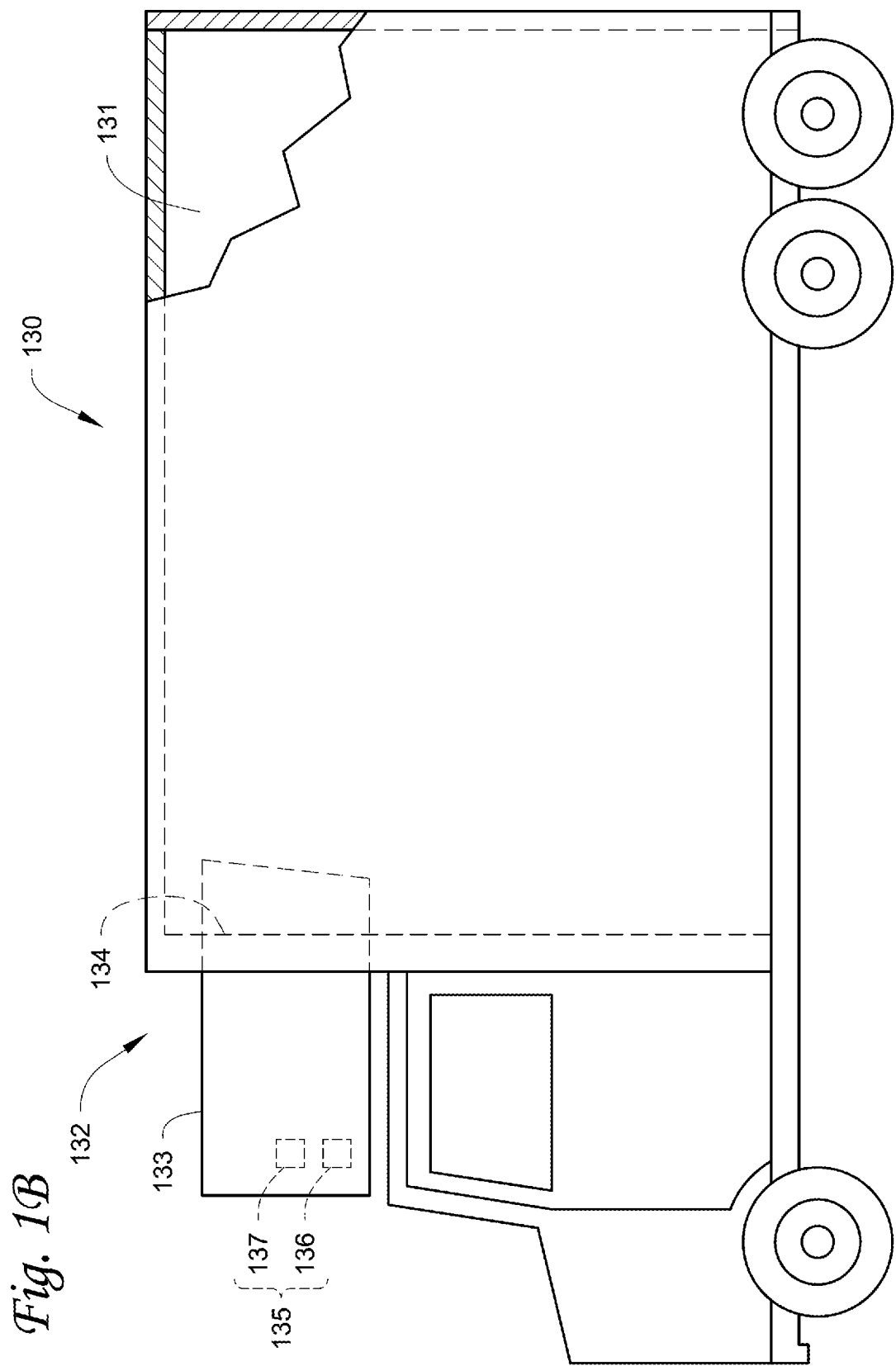

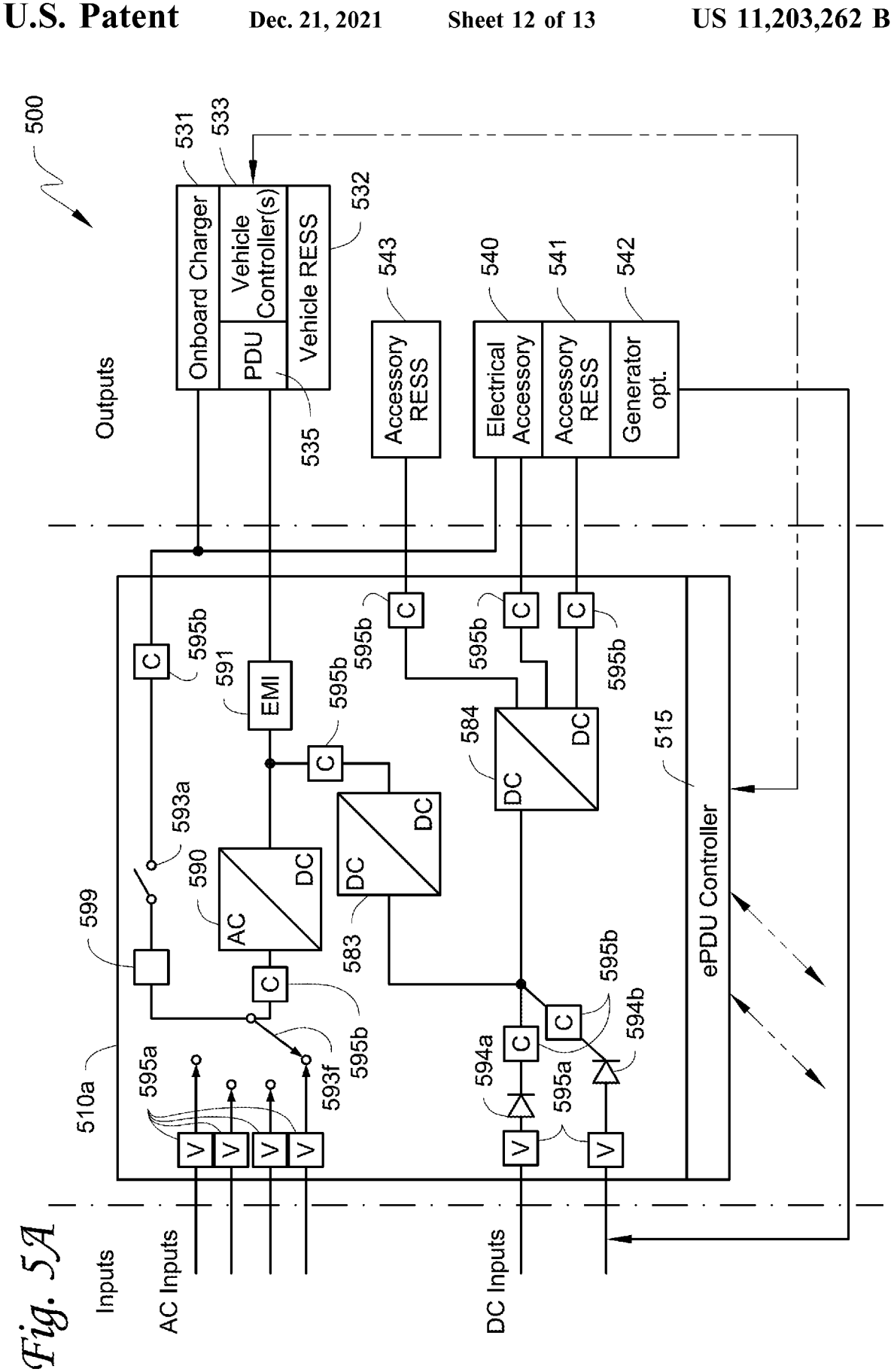

TRANSPORT CLIMATE CONTROL SYSTEM WITH AN ACCESSORY POWER DISTRIBUTION UNIT FOR MANAGING TRANSPORT CLIMATE CONTROL LOADS

FIELD

The disclosure herein relates to an electrically powered accessory configured to be used with at least one of a vehicle, trailer, and a transport container. More specifically, the disclosure relates to an accessory power distribution unit for managing power inputs, prioritizing and controlling power flows for an electrically powered accessory, and power management within a system.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

SUMMARY

The embodiments disclosed herein relate to an electrically powered accessory configured to be used with at least one of a vehicle, trailer, and a transport container. More specifically, the disclosure relates to an accessory power distribution unit for managing power inputs, prioritizing and controlling power flows for an electrically powered accessory, and power management within a system.

In one embodiment, a power distribution unit for use with an electrically powered accessory is disclosed. The electrically powered accessory is configured to be used with at least one of a vehicle, a trailer, and a transportation container. The power distribution unit includes at least one power input configured to receive electrical power from at least one of an electrical supply equipment and a second power source. The power distribution unit also includes an accessory power interface configured to provide electrical power to the electrically powered accessory. The power distribution unit further includes a vehicle power interface configured to provide electrical power to a vehicle electrical system of the vehicle. The vehicle electrical system has a vehicle electrical storage device. Also the power distribution unit includes at least one switch or at least one converter configured to selectively connect the at least one power input to a power bus, and selectively connect the power bus to at least one of the accessory power interface and the vehicle power interface. The power distribution unit also includes a controller configured to control the at least one switch or the at least one converter to provide electrical power to at least one of the electrically powered accessory and the vehicle electrical storage device. It will be appreciated that the controller of the power distribution unit can be a part of the controller of the electrical accessory.

In one embodiment, a power distribution unit for an electrically powered accessory is disclosed. The electrically powered accessory is configured to be used with at least one of a vehicle, a trailer, and a transportation container. The power distribution unit includes at least one power input configured to receive electrical power from at least one of an electric power take off (ePTO) of a vehicle electrical system and a second power source. The vehicle electrical system is configured to receive electrical power from an electrical supply equipment and store power in a vehicle electrical storage device. The power distribution unit also includes an electrical power interface configured to provide power to the electrically powered accessory. The power distribution unit further includes at least one switch or at least one converter configured to selectively connect the at least one power input to a power bus, and selectively connect the power bus to the electrical power interface. Also the power distribution unit includes a controller configured to control the at least one switch or the at least one converter to distribute the power received from the at least one power input, to the electrically powered accessory.

In one embodiment, a power distribution unit for use with a transport climate control system is disclosed. The power distribution unit includes at least one power input configured to receive electrical power from at least one of an electrical supply equipment and a second power source. The power distribution unit also includes an accessory power interface configured to provide electrical power to the transport climate control system. The power distribution unit further includes a vehicle power interface configured to provide electrical power to a vehicle electrical system of the vehicle. The vehicle electrical system has a vehicle electrical storage device. Also the power distribution unit includes at least one switch or at least one converter configured to selectively connect the at least one power input to a power bus, and selectively connect the power bus to at least one of the accessory power interface and the vehicle power interface. The power distribution unit also includes a controller configured to control the at least one switch or the at least one converter to provide electrical power to at least one of the transport climate control system and the vehicle electrical storage device.

In one embodiment, a power distribution unit for providing power to a transport climate control system is disclosed. The power distribution unit includes at least one power input configured to receive electrical power from at least one of an electric power take off (ePTO) of a vehicle electrical system and a second power source. The vehicle electrical system is configured to receive electrical power from an electrical supply equipment and store power in a vehicle electrical storage device. The power distribution unit also includes an electrical power interface configured to provide power to the transport climate control system. The power distribution unit further includes at least one switch or at least one converter configured to selectively connect the at least one power input to a power bus, and selectively connect the power bus to the electrical power interface. Also the power distribution unit includes a controller configured to control the at least one switch or the at least one converter to distribute the power received from the at least one power input, to the transport climate control system.

In some embodiments, cost of installation of an electrical infrastructure can be important as the additional infrastructure can be needed where e.g., large vehicles or trailers can be parked for charging. Installation of an electric vehicle supply equipment (EVSE) can be expensive. In some embodiments, even simple electrical power feeds can be expensive to install. This becomes even more of an issue when e.g., multiple electric pieces of equipment are used in a distribution center (e.g., a depot). In some embodiments, there can be no single standard power source. Even "standard" EVSE can have multiple different types. In some embodiments, there can be additional bonus electrical services (e.g., utility power source, etc.) available in addition to the EVSE. In a hybrid system, the power balancing can be dynamic to account for management of multiple methods of power generation, multiple loads, multiple rechargeable energy storage system (RESS), etc. Embodiments disclosed herein can help manage various power inputs, manage and prioritize the power flows. Embodiments disclosed herein can also help to manage additional power sources (e.g., utility power source, etc.) functionality and improve the power performance.

BRIEF DESCRIPTION OF THE DRAWINGS

References are made to the accompanying drawings that form a part of this disclosure and which illustrate embodiments in which the systems and methods described in this specification can be practiced.

FIG. 1B illustrates a side view of a truck with a transport climate control system, according to one embodiment.

FIG. 5A is a schematic illustration of an internal configuration of an accessory PDU and an interface of the accessory PDU, power sources, a vehicle and an electrically powered accessory configured to be used with at least one of a vehicle, trailer, and a transport container, according to a third embodiment.

Like reference numbers represent like parts throughout.

DETAILED DESCRIPTIONS

Figure 1A:
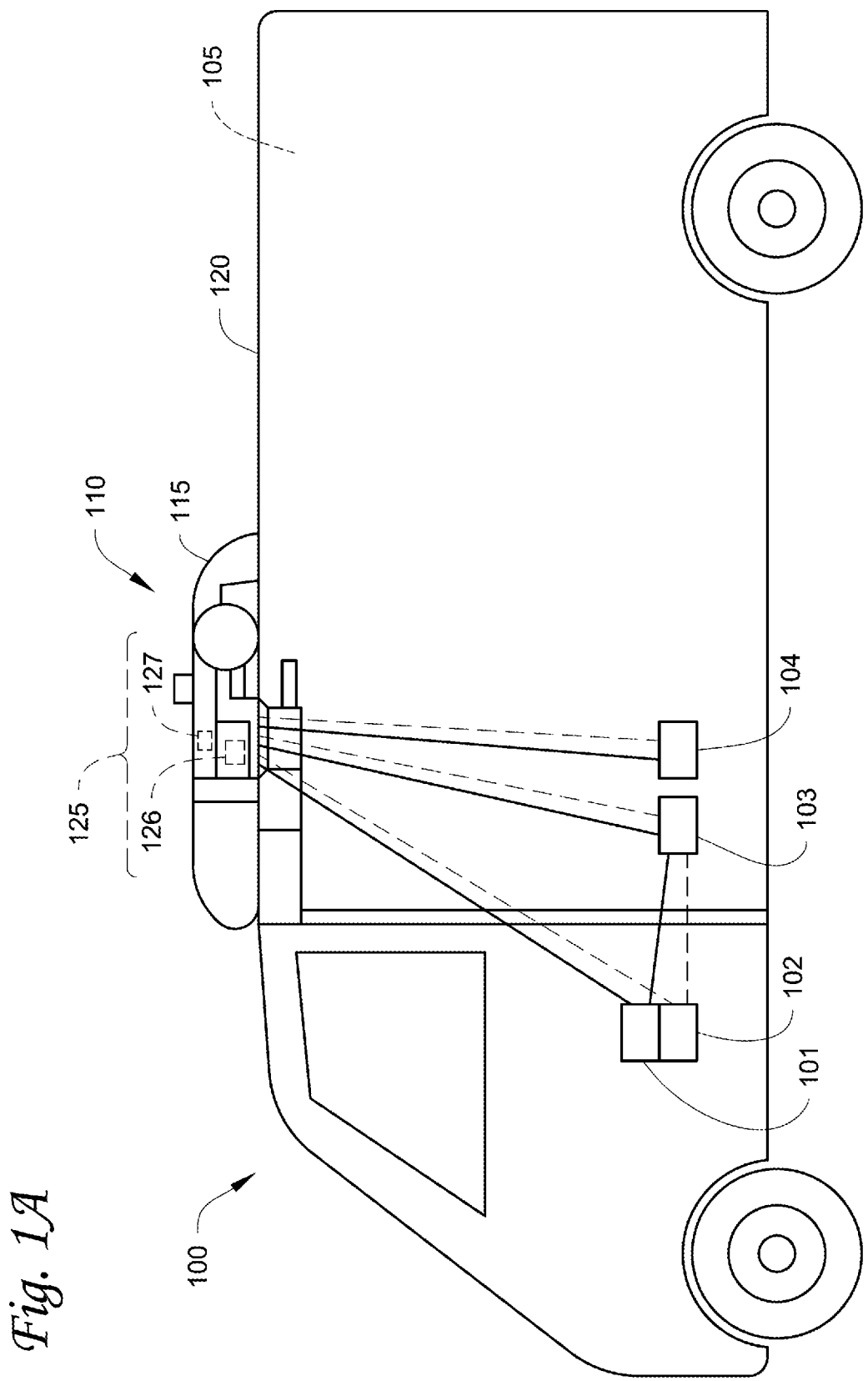
FIG. 1A illustrates a side view of a van with a transport climate control system, according to one embodiment.

The embodiments disclosed herein relate to an electrically powered accessory configured to be used with at least one of a vehicle, trailer, and a transport container. More specifically, the disclosure relates to an accessory power distribution unit for managing power inputs, prioritizing and controlling power flows for an electrically powered accessory, and power management within a system.

It is noted that: U.S. application Ser. No. 16/565,063, "SYSTEM AND METHOD FOR MANAGING POWER AND EFFICIENTLY SOURCING A VARIABLE VOLTAGE FOR A TRANSPORT CLIMATE CONTROL SYSTEM,"; U.S. application Ser. No. 16/565,110, "TRANSPORT CLIMATE CONTROL SYSTEM WITH A SELF-CONFIGURING MATRIX POWER CONVERTER,"; U.S. application Ser. No. 16/565,146, "OPTIMIZED POWER MANAGEMENT FOR A TRANSPORT CLIMATE CONTROL ENERGY SOURCE,"; U.S. Provisional Application No. 62/897,833, "OPTIMIZED POWER DISTRIBUTION TO TRANSPORT CLIMATE CONTROL SYSTEMS AMONGST ONE OR MORE ELECTRIC SUPPLY EQUIPMENT STATIONS,"; European Patent Application Number 19382776.3, "PRIORITIZED POWER DELIVERY FOR FACILITATING TRANSPORT CLIMATE CONTROL,"; U.S. application Ser. No. 16/565,235, "AN INTERFACE SYSTEM FOR CONNECTING A VEHICLE AND A TRANSPORT CLIMATE CONTROL SYSTEM,"; U.S. application Ser. No. 16/565,252, "DEMAND-SIDE POWER DISTRIBUTION MANAGEMENT FOR A PLURALITY OF TRANSPORT CLIMATE CONTROL SYSTEMS,"; and U.S. application Ser. No. 16/565,282, "OPTIMIZED POWER CORD FOR TRANSFERRING POWER TO A TRANSPORT CLIMATE CONTROL SYSTEM,"; all filed concurrently herewith on Sep. 9, 2019, and the contents of which are incorporated herein by reference.

While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

In many instances including during vehicle charging, the vehicle may limit/disable power output to an ePTO or to auxiliary applications. When an electrically powered accessory (e.g., a climate control unit requiring substantial power to operate) is associated with the vehicle, a load loss (e.g., produce, frozen foods, pharmaceuticals, etc. may not be safe or fresh) could occur due to lack of power for running/ operating (e.g., keeping the required temperature, humidity, airflow, etc.) the electrically powered accessory. Embodiments disclosed herein can help to address e.g., load loss issues. For example, when an electric RV connects to an EVSE at a campsite, embodiments disclosed herein can help to enable the electrically powered accessory use priority over the charging of the vehicle if the user so desires. Embodiments disclosed herein can help e.g., to enable electrically powered accessory use in e.g., a bus, when charging the bus, and can help to give priority for running HVAC, onboard power sockets for vacuums, lights, etc. when cleaning the bus.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (not shown) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller unit 115 may comprise a single integrated control unit 126 or may comprise a distributed network of climate controller elements 126, 127. The number of distributed control elements in a given network can depend upon the particular application of the principles described herein.

Figure 2:
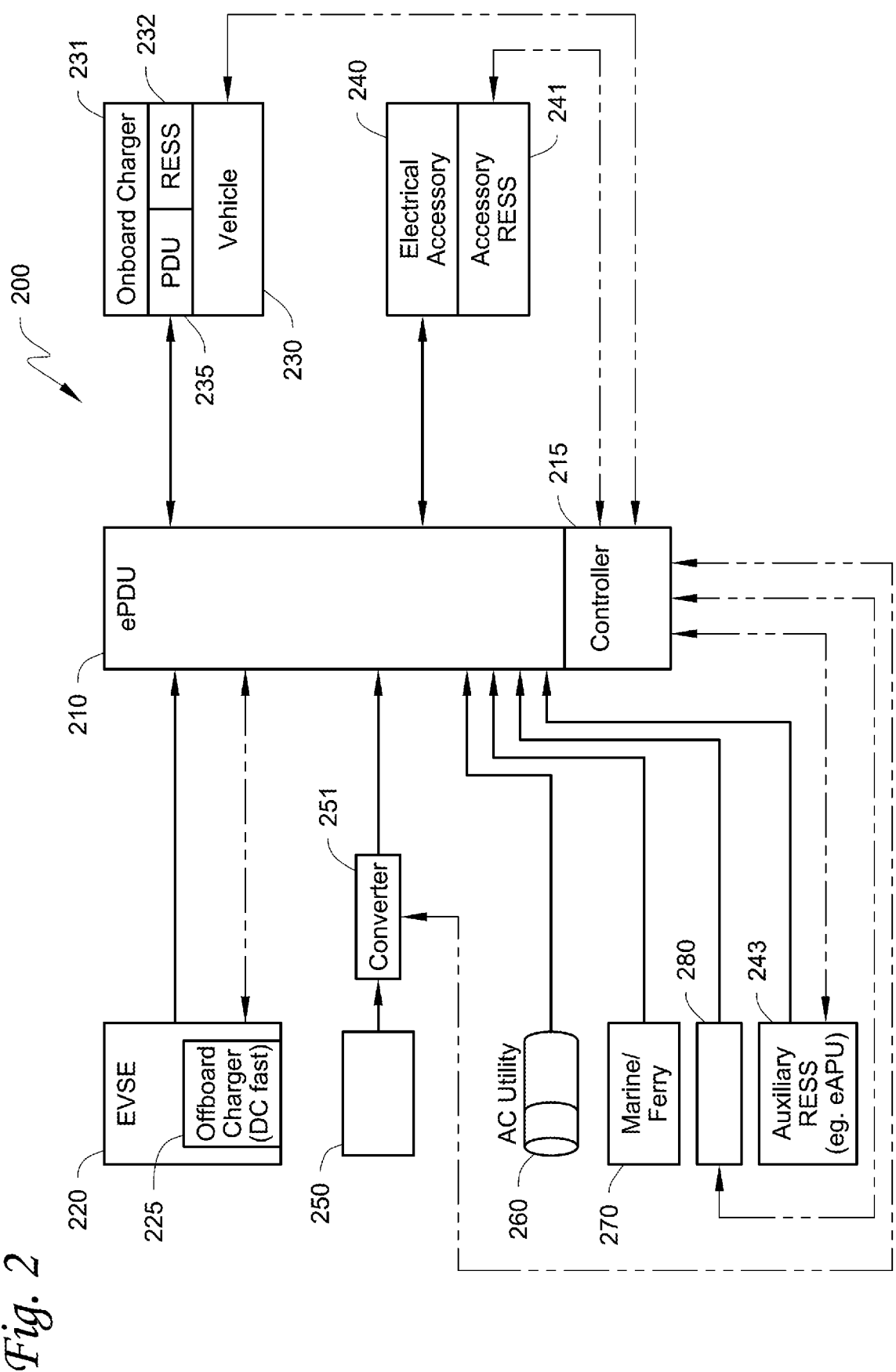
FIG. 2 is a schematic illustration of an interface system between an accessory power distribution unit (PDU), power sources, a vehicle and an electrically powered accessory configured to be used with at least one of a vehicle, trailer, and a transport container, according to one embodiment.
Figure 3A:
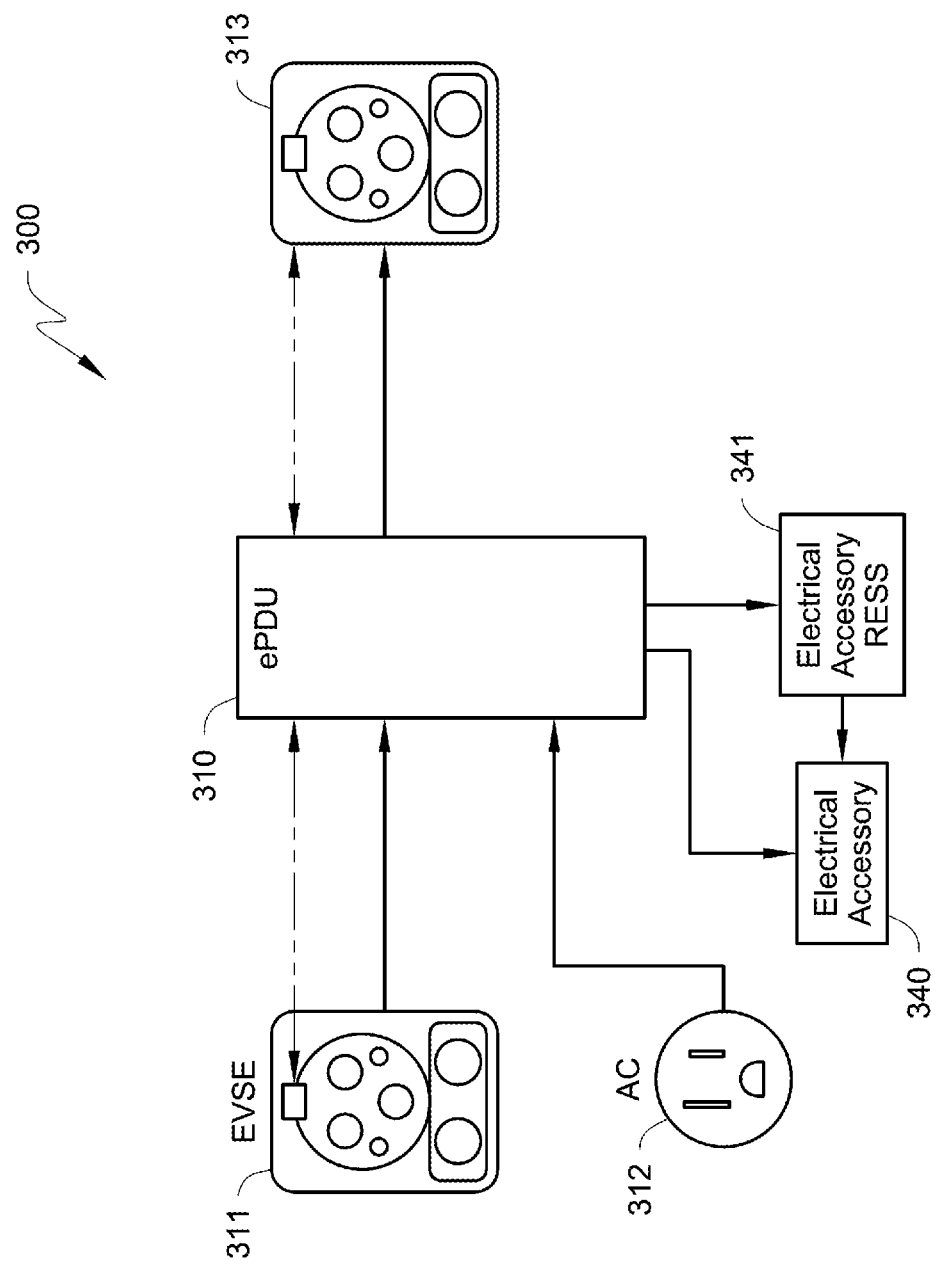
FIG. 3A is a schematic illustration of an interface system among an electrical supply equipment, an accessory PDU, a vehicle, and an electrically powered accessory configured to be used with at least one of a vehicle, a trailer, and a transport container, according to a first embodiment.
Figure 3B:
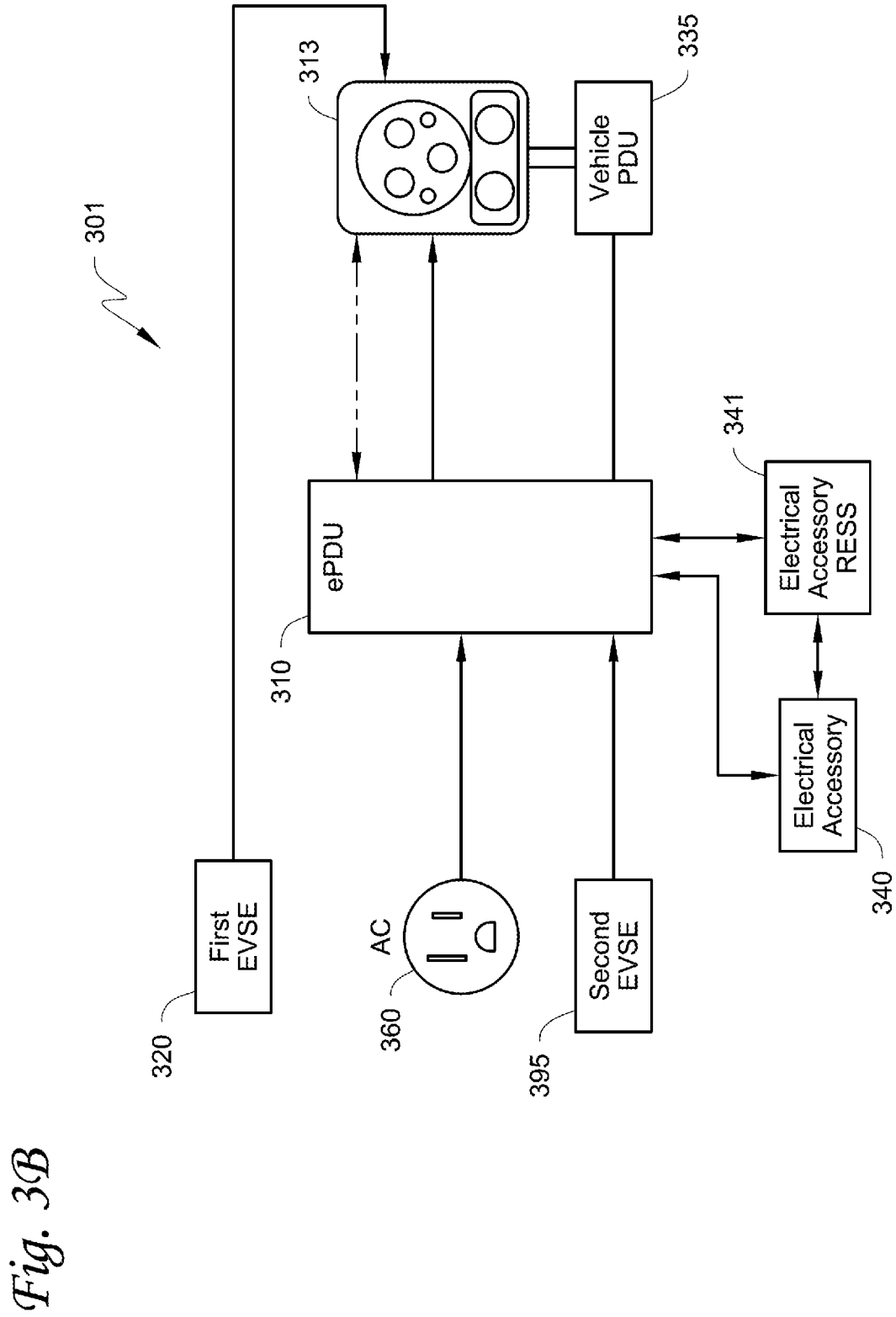
FIG. 3B is a schematic illustration of an interface system among electrical supply equipment(s), an accessory PDU, a vehicle, and an electrically powered accessory configured to be used with at least one of a vehicle, a trailer, and a transport container, according to a second embodiment.

The climate-controlled van 100 can also include a vehicle PDU 101, a VES 102, a standard charging port 103, and/or an enhanced charging port 104 (see FIGS. 3A and 3B for the detailed description about the standard charging port and the enhanced charging port). The VES 102 can include a controller (not shown). The vehicle PDU 101 can include a controller (not shown). In one embodiment, the vehicle PDU controller can be a part of the VES controller or vice versa. In one embodiment, power can be distributed from e.g., an EVSE (not shown), via the standard charging port 103, to the vehicle PDU 101. Power can also be distributed from the vehicle PDU 101 to an electrical supply equipment (ESE, not shown) and/or to the CCU 115 (see solid lines for power lines and dotted lines for communication lines). In another embodiment, power can be distributed from e.g., an EVSE (not shown), via the enhanced charging port 104, to an ESE (not shown) and/or to the CCU 115. The ESE can then distribute power to the vehicle PDU 101 via the standard charging port 103. See FIGS. 2, 3A, and 3B for a more detailed discussion of the ESE.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (not shown) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

It will be appreciated that similar to the climate-controlled van 100 shown in FIG. 1A, the climate-controlled straight truck 130 of FIG. 1B can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133.

Figure 1C:
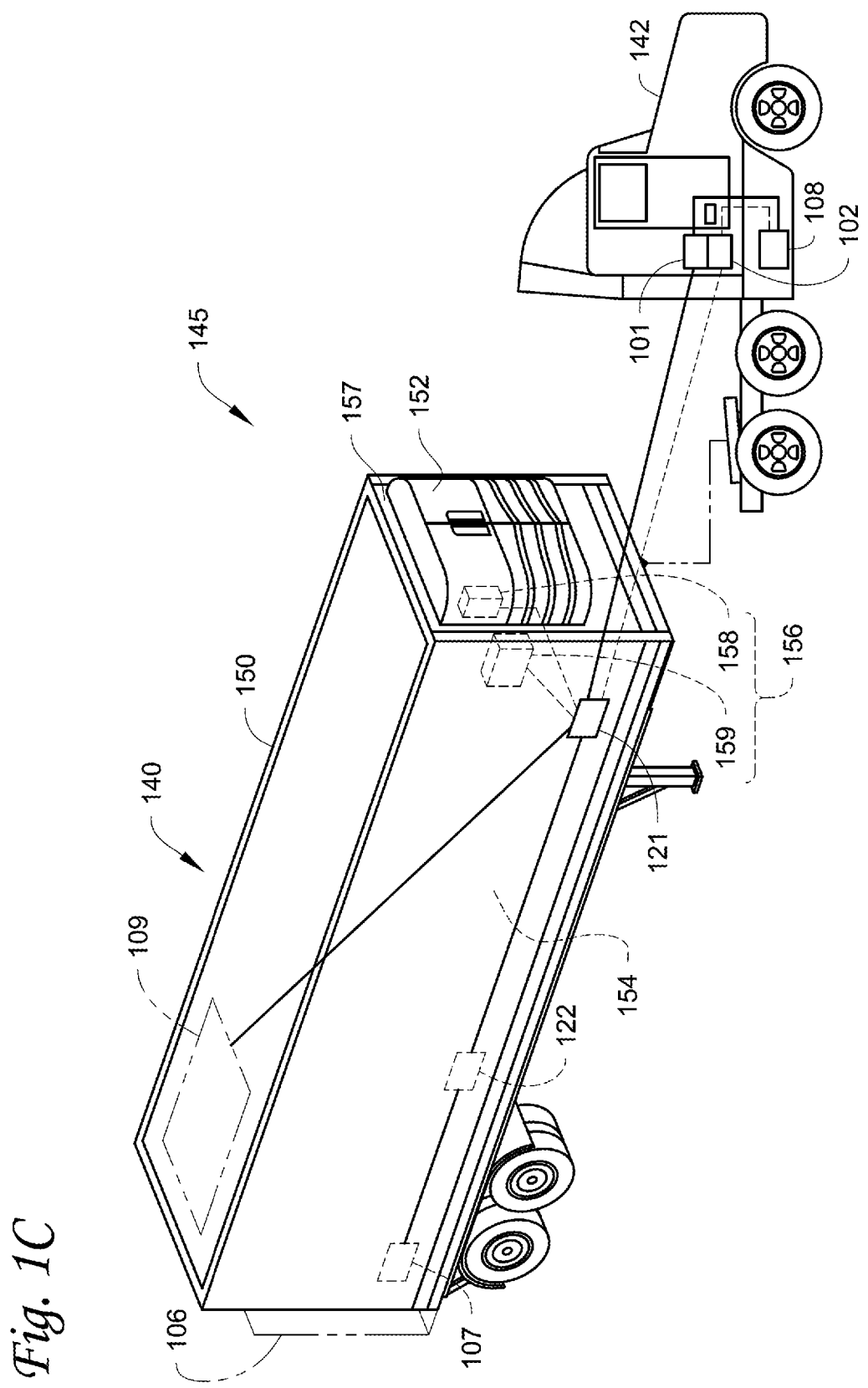
FIG. 1C illustrates a perspective view of a climate controlled transport unit, with a transport climate control system, attached to a tractor, according to one embodiment.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (not shown) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

In some embodiments, the tractor 142 can include an optional APU 108. The optional APU 108 can be an electric auxiliary power unit (eAPU). Also, in some embodiments, the tractor 142 can also include a vehicle PDU 101 and a VES 102 (not shown). The APU 108 can provide power to the vehicle PDU 101 for distribution. It will be appreciated that for the connections, solid lines represent power lines and dotted lines represent communication lines. The climate controlled transport unit 140 can include a PDU 121 connecting to power sources (including, for example, an optional solar power source 109; an optional power source 122 such as Genset, fuel cell, undermount power unit, auxiliary battery pack, etc.; and/or an optional liftgate battery 107, etc.) of the climate controlled transport unit 140. The PDU 121 can include a PDU controller (not shown). The PDU controller can be a part of the climate controller 156. The PDU 121 can distribute power from the power sources of the climate controlled transport unit 140 to e.g., the transport climate control system 145. The climate controlled transport unit 140 can also include an optional liftgate 106. The optional liftgate battery 107 can provide power to open and/or close the liftgate 106.

It will be appreciated that similar to the climate-controlled van 100, the climate controlled transport unit 140 attached to the tractor 142 of FIG. 1C can also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152. It will be appreciated that the charging port(s) 103 and/or can be on either the tractor 142 or the trailer. For example, in one embodiment, the standard charging port 103 is on the tractor 142 and the enhanced charging port 104 is on the trailer.

Figure 1D:
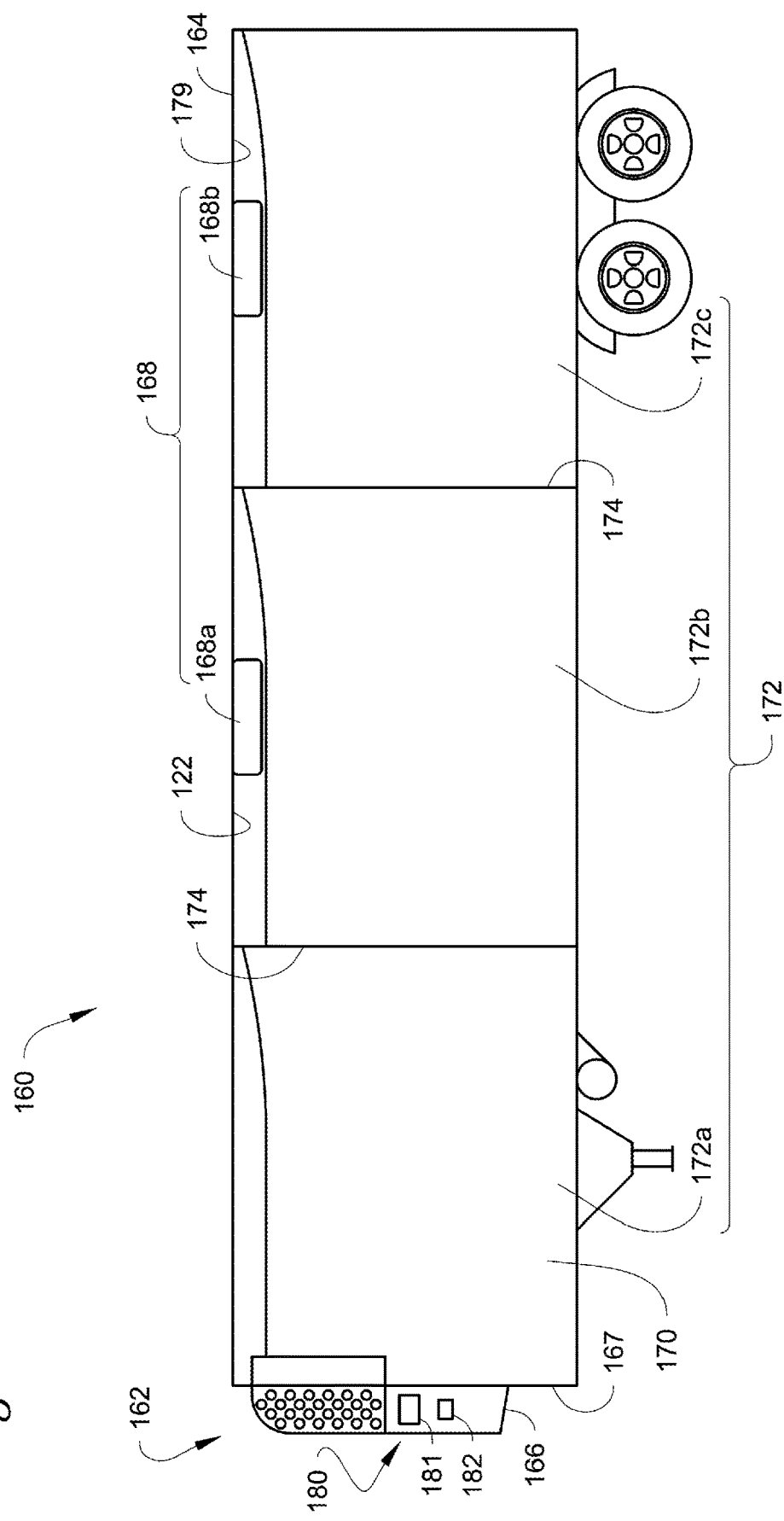
FIG. 1D illustrates a side view of a climate controlled transport unit with a multi-zone transport climate control system, according to one embodiment.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 166. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (not shown) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a,b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

It will be appreciated that similar to the climate-controlled van 100, the climate controlled transport unit 160 of FIG. 1D can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166.

Figure 1E:
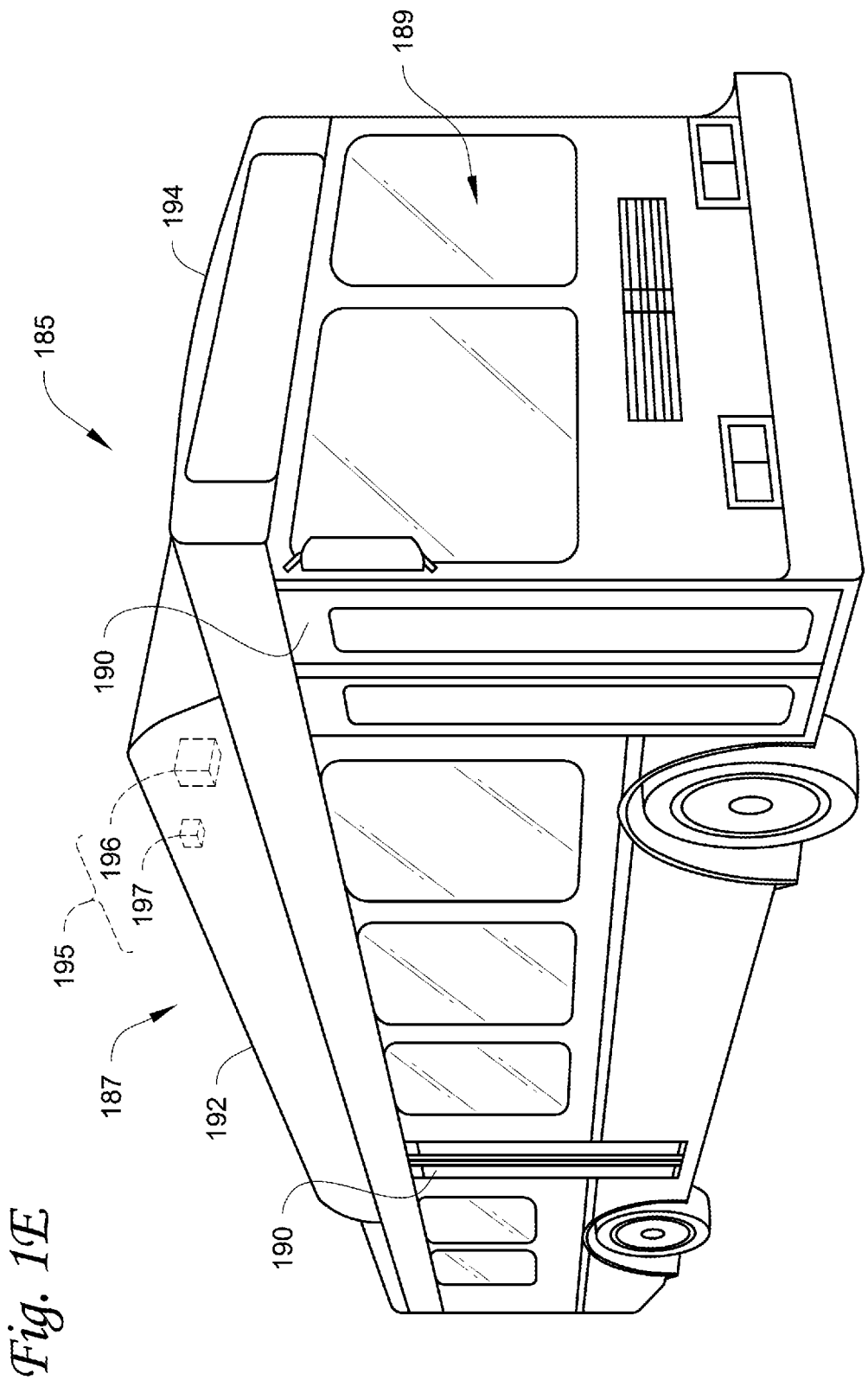
FIG. 1E illustrates a perspective view of a mass-transit vehicle including a transport climate control system, according to one embodiment.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

It will be appreciated that similar to the climate-controlled van 100, the vehicle 185 including a transport climate control system 187 of FIG. 1E can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

FIG. 2 is a schematic illustration of an interface system 200 between an accessory power distribution unit (PDU), power sources, a vehicle and an electrically powered accessory configured to be used with at least one of a vehicle, trailer, and a transport container, according to one embodiment.

The interface system 200 includes an accessory PDU 210. The accessory PDU 210 includes a controller 215. The accessory PDU 210 can connect to and/or communicate with an electrical supply equipment (ESE) 220. The ESE 220 can be an EVSE, an EV charging station, a vehicle charger system, etc. The accessory PDU 210 can also connect to and/or communicate with a vehicle 230 and/or an electrically powered accessory 240 configured to be used with at least one of the vehicle 230, a trailer, and a transport container. The accessory PDU 210 can enable fault monitoring and system protection, which can be used for protecting the interface system 200 and can enable analytics and features which allow for the electrically powered accessory 240 use to not void a manufacturer warranty of the vehicle 230.

It will be appreciated that the accessory PDU 210 can control the ESE 220 (or other power sources such as the utility power, etc.) to distribute electrical power received from the ESE 220 (or other power sources such as the utility power, etc.) to a vehicle 230 through a standard charging port, to the electrically powered accessory 240, and/or to the accessory RESS 241. The accessory PDU 210 can also control power sources (including power from ePTO, utility power, a second ESE, etc.) to distribute electrical power received from the power sources to the electrically powered accessory 240, and/or to the accessory RESS 241.

The ESE 220 includes an off-board charger 225. The off-board charger 225 can be a direct current (DC) charger for fast charging.

The vehicle 230 includes a vehicle electrical system having an on-board charger 231 and a RESS 232. See, for example, U.S. Pat. No. 8,441,228 (which is incorporated by reference in its entirety) for a description of a vehicle electrical system. The vehicle electrical system can provide electrical power to the electrical loads of the vehicle, and/or to charge or discharge the energy storage of the vehicle. The vehicle 230 can be, for example, the climate-controlled van 100, the climate-controlled straight truck 130, the tractor 142 with a climate controlled transport unit 140 attached to, the climate controlled transport unit 160, and/or the vehicle 185 of FIGS. 1A-1E and/or a recreational vehicle (RV). The vehicle electrical system also includes a power distribution unit (PDU) 235. The PDU 235 can include a controller (not shown) configured to distribute electric power of the vehicle electrical system to loads of the vehicle electrical system.

Electrical loads (to be powered) of the interface system 200 can include low voltage (LV) DC loads such as solenoids, fans, compressor motors, controllers, battery chargers, etc. Electrical loads (to be powered) of the interface system 200 can also include high voltage (HV) DC loads such as fan motor, compressor motor, battery chargers, batteries, etc. Electrical loads (to be powered) of the interface system 200 can further include HV AC loads such as fan motor, compressor motor, battery chargers, OnBoard charger, AC Power Module (ACPM), etc. Also Electrical loads (to be powered) of the interface system 200 can include motors having power converters which can include DC/DC converters and/or motor control inverters. ACPM can be a power converter used to take input of single-phase or three-phase AC power and create a DC power to feed the DC link. The ACPM can be contained within the electrically powered accessory 240 or the accessory PDU 210. ACPM can also be a vehicle OnBoard charger for charging the vehicle RESS 232.

The electrically powered accessory 240 can include an accessory RESS 241. The electrically powered accessory 240 can be, for example, the transport climate control system 110, 132, 145, 162, and/or 187 of FIGS. 1A-1E. The accessory RESS 241 can provide power to operate the electrically powered accessory 240. The electrically powered accessory 240 can include HV and/or LV loads including AC (single-phase and/or three-phase) and/or DC loads. In one embodiment, AC power from the ESE 220 can be converted to DC voltage via the accessory PDU 210, and then converted to AC voltage via the accessory PDU 210 to supply power to e.g., a three-phase AC driven CCU.

The accessory PDU 210 can also connect to and/or communicate with a power source 250, a utility power source 260, a marine and/or ferry power source 270, a power source 280, and/or an auxiliary RESS 243. The power source 250 can be a solar power source, an auxiliary energy source (e.g., battery pack), an electric APU auxiliary energy storage, a fuel cell power source, and/or a liftgate energy storage, etc. The power source 250 can connect to a converter 251, which in turn can connect to the accessory PDU 210. It will be appreciated that the converter 251 can be a part of the accessory PDU 210. The converter 251 can be a bidirectional power converter to allow power flow from/to a power input of the converter 251 to/from a power output of the converter 251. In some embodiments, the converter 251 can be a DC to DC boost or buck converter. In some embodiments, the converter 251 can also be a DC to AC inverter. The utility power source 260 can provide single-phase alternating current (AC) and/or three-phase AC power. The marine and/or ferry power source 270 can, for e.g., convert energy carried by ocean waves, tides, salinity, and/or ocean temperature differences to generate electrical power. The power source 280 can be a generator set (Genset) power source. The power source 280 can also be a CCU power source engine (e.g., engine with electric generator and/or inverter and/or converter). The power source 280 can further be a micro-turbine with generator to provide electrical power. The power source 280 can be a combination of e.g., an electrical generator and an engine mounted together to form a single piece of equipment that produces electrical power. In one embodiment, the auxiliary RESS 243 can be an electric auxiliary power unit (eAPU). The electrical power supplied from the marine and/or ferry power source 270, the power source 280, and/or the auxiliary RESS 243 can be AC and/or DC power.

FIG. 2 shows power lines (solid lines) between/among the components and communication lines (dotted lines) between controller 215 and the components (e.g., controllers of the components). It will be appreciated that the communication(s) between/among the components of FIG. 2 can be accomplished wirelessly or through wire connection(s), through any suitable communication media and/or using any suitable communication protocol(s).

In operation, the ESE 220 can be configured to supply electrical power (or energy) for powering and/or charging the vehicle 230 (e.g., the vehicle electrical system of the vehicle 230) and/or the electrically powered accessory 240, e.g. through the accessory PDU 210, via connectors (e.g., charging port, not shown). The electric power supplied from the ESE 220 (and/or other power sources) can include alternating current (AC) and/or direct current (DC) power. The AC power can be single-phase AC or three phase AC power. The DC power can be Low Voltage (LV) DC power (e.g., Class A) and/or High Voltage (HV) DC power (e.g., Class B). As defined herein, "low voltage" refers to Class A of the ISO 6469-3 in the automotive environment, in particular, a maximum working voltage of between 0V and 60V DC or between 0V and 30V AC. As defined herein, "high voltage" refers to Class B of the ISO 6469-3 in the automotive environment, in particular, a maximum working voltage of between 60V and 1500V DC or between 30V and 1000V AC. The connectors can be any suitable connectors that support e.g., Combined Charging System (CCS, guided by e.g., CharIN), CHAdeMO, Guobiao recommended-standard 20234, Tesla Supercharger, and/or other EVSE standards. Typically the AC power and the DC power for fast charging from the ESE 220 work exclusively. Embodiments disclosed herein can enable supplying both the AC power and the DC power for fast charging from the ESE 220, via e.g., the accessory PDU 210, to e.g., supply power to the vehicle 230 and/or charge the vehicle RESS 232 with the DC power and to operate the electrically powered accessory 240 with AC power.

The controller 215 is configured to manage power inputs from e.g., the ESE 220 and/or other power sources such as a utility power source, etc., and to prioritize and control power flows to the vehicle 230 and/or the electrically powered accessory 240, etc.

The controller 215 can communicate with the vehicle 230, the vehicle RESS 232, the OnBoard charger 231, the accessory RESS 241, the auxiliary RESS 243, intelligent power sources 280 such as a Genset, and/or the converter 251.

The controller 215 can communicate with the ESE 220 using e.g., powerline communications, Pulse Width Modulation (PWM) communications, Local Interconnect Network (LIN) communications, Controller Area Network (CAN) communications, and/or Pilot signal analog feedback, etc. to support e.g., CCS, CHAdeMO, Guobiao recommended-standard 20234, Tesla Supercharger, and/or other EVSE standards.

The communications between the controller 215 and the ESE 220 include e.g., a Control Pilot (CP) line and a Proximity Pilot (PP) line. The PP line is also known as Plug Present for determining status and capability of the charging port. The CP line can be used e.g., by the controller 215 to indicate e.g., the charging level(s) of e.g., the vehicle 230 and/or the electrically powered accessory 240, to initiate charging, and/or to communicate other information to the ESE 220. The ESE 220 can use the CP line to detect e.g., the presence of the vehicle 230 and/or the electrically powered accessory 240 e.g. via the accessory PDU 210, to communicate e.g., the maximum and/or minimum allowable charging current and/or voltage to the controller 215, and/or to control e.g., the charging current and/or voltage, and/or to control the beginning and/or ending of charging. For example, in SAE J1772 (a North American standard for electrical connectors for electric vehicles maintained by the SAE International), the PWM duty cycle can set the current limit for power delivery. The PP line can be used to prevent movement of the vehicle 230 and/or the electrically powered accessory 240 and to indicate e.g., the latch release button to the vehicle 230 and/or the electrically powered accessory 240, e.g. via the accessory PDU 210. It will be appreciated that there can be a connector release switch connected in the PP circuit, and pressing on the connector release switch can modify the PP signal value to indicate charging port being disconnected to the controllers on the PP line.

In one embodiment, the interface system 200 can include a user interface device (not shown). The user interface device can be a mobile device (e.g., phone, computer, etc.) or a server. The user interface device can connect to and/or communicate with the ESE 220 and the accessory PDU 210. It will be appreciated that the communications from the ESE 220 to the accessory PDU 210 can be sent to the user interface device. A user can review the information from the ESE 220 and send request(s) and/or confirmation(s) to the ESE 220 and/or the controller 215, to make adjustment(s) and/or request(s) accordingly, via the user interface device. The user interface device can be used to view charging rate (of the electric power), perform payment authorization, etc., and/or can track how much electrical power goes to the vehicle 230 and/or to the electrically powered accessory 240, and/or split payment billing, etc.

The controller 215 can communicate with a controller (not shown, e.g., the controller 125, 135, 156, 180, and/or 195 of FIGS. 1A-1E) of the electrically powered accessory 240. In one embodiment, the controller 215 can be integrated with the controller (e.g., the controller 125, 135, 156, 180, and/or 195 of FIGS. 1A-1E) of the electrically powered accessory 240. In one embodiment, the electrically powered accessory 240 can include sensors (e.g., temperature, pressure, voltage, current, battery status, and/or battery charging level sensor, etc.). The electrically powered accessory 240 can communicate the status (e.g., status of the sensors and/or charge status) to the controller 215. In another embodiment, the controller 215 can include sensors (e.g., temperature, pressure, voltage, current, battery status, and/or battery charging level sensor, etc.). The controller 215 can communicate and request the status (e.g., status of the sensors and/or charge status) to the electrically powered accessory 240. If the electrically powered accessory 240 indicates that electric power is needed to power and/or to charge the electrically powered accessory 240 (e.g., the accessory RESS 241), the controller 215 can e.g., control the accessory PDU 210 to distribute power (AC and/or DC) received from the ESE 220 (and/or other power sources) to the electrically powered accessory 240.

The controller 215 can communicate with a PDU 235 of the vehicle 230. The PDU 235 can include a controller (not shown). In one embodiment, the vehicle 230 can include sensors (e.g., temperature, location, pressure, voltage, current, battery status, and/or battery charging level sensor, etc.). The sensors can sense e.g., an ambient temperature, a temperature of a user's (e.g., a driver's) space/seat, a temperature of the vehicle RESS 232, a location of the vehicle, an ambient pressure, voltage/current of a VES circuit, a charging level of the vehicle RESS, etc. The vehicle 230 can communicate the status (e.g., status of the sensors and/or charge status) to the controller 215. In another embodiment, the controller 215 can include sensors (e.g., temperature, location, pressure, voltage, current, battery status, and/or battery charging level sensor, etc.). The sensors can sense e.g., an ambient temperature, a temperature of a climate controlled space of the electrically powered accessory, a temperature of the accessory RESS, a location of the electrically powered accessory, an ambient pressure, discharge/suction pressure of a compressor of the electrically powered accessory, voltage/current of an electrically powered accessory circuit, a charging level of the accessory RESS, etc. The controller 215 can communicate the status (e.g., status of the sensors and/or charge status) to the vehicle 230. It will be appreciated that the controller 215 can communicate messages to the vehicle 230 for the vehicle 230 to operate in a proper system operational mode. The status can be modified. For example, when the vehicle 230 is fully charged and ready to drive, but the controller 215 determines that the electrical accessory 240 still requires attention, the controller 215 can prevent the vehicle 230 from disconnecting and driving away. If the vehicle 230 indicates that electric power is needed to charge the vehicle 230, the controller 215 can control the accessory PDU 210 to distribute power (AC and/or DC) received from the ESE 220 (and/or other power sources) to the vehicle 230 to provide power to the on-board charger 231 and/or to charge the RESS 232.

The controller 215 can communicate the information received from the ESE 220 (and/or other power sources) to the vehicle 230 (e.g., the PDU 235). The vehicle 230 can initiate/request charging from the ESE 220, e.g., via the controller 215 and the CP line.

The controller 215 can obtain sensed data (via the sensors) for the power inputs, monitor power usage, and communicate with all available energy sources to balance power (e.g., to balance charging level between vehicle RESS and accessory RESS, etc.). The controller 215 can have telematics capability. Data can be shared over telematics to coordinate and perform data analytics on the power usage of the systems (and/or enable a priority mode to supply power to power demands with a higher priority level). In some embodiments, the controller 215 can drive the door interlock (to prevent the vehicle and/or the electrically powered accessory from moving, for example, when the door is open), status lights for charging, and/or the lock on the connector.

It will be appreciated that power demand/request from the electrically powered accessory 240 (e.g., for powering the transport climate control system to keep the cargo (e.g., produce, frozen foods, pharmaceuticals, etc.) safe and/or fresh) can have higher priority level (e.g., the cargo is regulated by government bodies or of high economic value) than power demand/request from the vehicle 230 (e.g., for charging the vehicle 230). As such, the controller 215 can control the accessory PDU 210 to distribute power (AC and/or DC) received from the ESE 220 (and/or other power sources) to the electrically powered accessory 240 first, and then to the vehicle 230 if the higher priority level power demand from the electrically powered accessory 240 is satisfied. In some embodiments, power demand/request from the vehicle 230 can have higher priority level than power demand/request from the power demand/request from the electrically powered accessory 240. As such, the controller 215 can control the accessory PDU 210 to distribute power (AC and/or DC) received from the ESE 220 (and/or other power sources) to the vehicle 230 first, and then to the electrically powered accessory 240 if the higher priority level power demand from the vehicle 230 is satisfied.

It will also be appreciated that the controller 215 can control the accessory PDU 210 to distribute power (AC and/or DC) received from the ESE 220 (and/or other power sources) to the vehicle 230 and to the electrically powered accessory 240 simultaneously (e.g., AC power (or one power input) to the electrically powered accessory 240 and DC power (or another power input) to the vehicle 230, or vice versa, if one type of power (AC or DC) and/or one power input (e.g., ESE, utility power, etc.) is sufficient to satisfy the higher priority level power demand). It will further be appreciated that the priority level of power demand can be predetermined or determined by a user and communicated to the controller 215. Also it will be appreciated that the priority level can be overridden by e.g., feedback from a human machine interface (HMI) to force certain operational modes.

The controller 215 can communicate with the converter 251 to exchange operational information regarding e.g., power performance, for example, voltages and/or currents and/or operational levels such as the speed setpoint of the compressor converter drive.

The controller 215 can communicate with the power source 280 (e.g., Genset) to communicate power performance and operation, for example, the maximum power capability of the Genset (which can change depending on operational area, such as operational speed limitations in particular areas) and/or power supplied including voltage, current, and/or frequency. The controller 215 can command the Genset on and the power level the Genset can operate at.

The controller 215 can communicated with the Auxiliary RESS 243 to communicate power capability (e.g., available voltage and/or current), state of charge, and/or priority level of charging the Auxiliary RESS 243.

It will be appreciated that the communication can be conducted via e.g., powerline communications, Pulse Width Modulation (PWM) communications, Local Interconnect Network (LIN) communications, Controller Area Network (CAN) communications, and/or any other suitable communications.

Figure 3C:
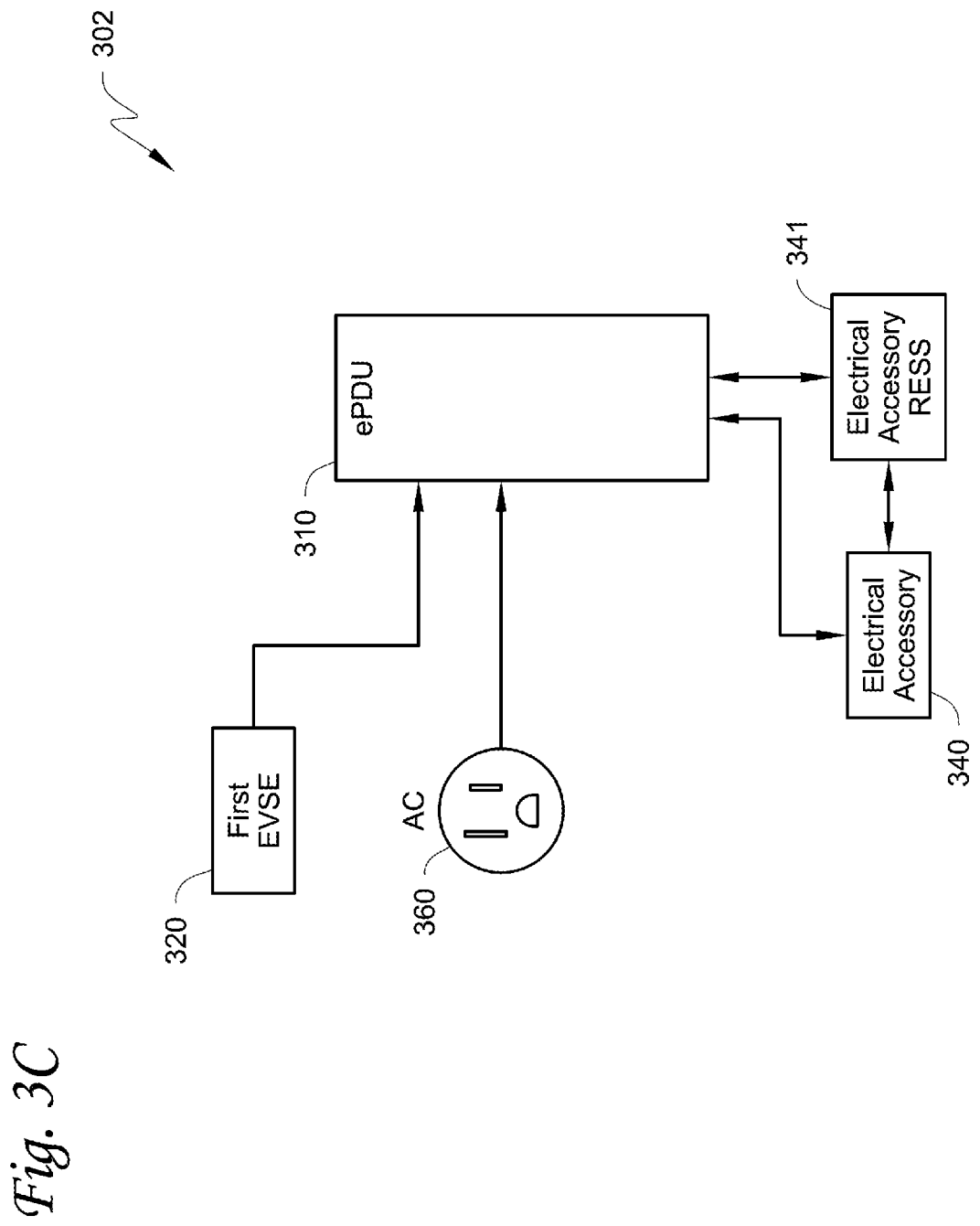
FIG. 3C is a schematic illustration of an interface system between an electrical supply equipment and an electrically powered accessory configured to be used with at least one of a vehicle, a trailer, and a transport container, according to a third embodiment.

FIG. 3A is a schematic illustration of an interface system 300 among an electrical supply equipment, an accessory PDU, a vehicle, and an electrically powered accessory configured to be used with at least one of a vehicle, a trailer, and a transport container, according to a first embodiment. FIG. 3B is a schematic illustration of an interface system 301 among electrical supply equipment(s), an accessory PDU, a vehicle, and an electrically powered accessory configured to be used with at least one of a vehicle, a trailer, and a transport container, according to a second embodiment. FIG. 3C is a schematic illustration of an interface system 302 between an electrical supply equipment and an electrically powered accessory configured to be used with at least one of a vehicle, a trailer, and a transport container, according to a third embodiment.

As shown in FIG. 3A, the accessory PDU 310 can connect to and/or communicate with an ESE (not shown), through an enhanced charging port 311. The enhanced charging port 311 can be any suitable charging port in compliance with one or more of the CCS, CHAdeMO, Guobiao recommended-standard 20234, Tesla Supercharger, and/or other EVSE standards, with portions or all of the communication/control pins and/or AC and/or DC power supply pins (from one of more of the different EVSE standards) populated/enabled. The accessory PDU 310 can be e.g., the accessory PDU 210 of FIG. 2. The ESE can be the ESE 220 of FIG. 2. The accessory PDU 310 can connect to and/or communicate with an AC power source 312. The AC power source 312 can be the power source 250, the utility power source 260, the marine and/or ferry power source 270, the power source 280, and/or the auxiliary RESS 243 of FIG. 2 or any other suitable power source.

The accessory PDU 310 can control the ESE to distribute electrical power received from the ESE to a vehicle (not shown, e.g., the vehicle 230 of FIG. 2) through a standard charging port 313, to the electrically powered accessory 340, and/or to the accessory RESS 341. The standard charging port (e.g., a vehicle mounted receptacle) 313 can be any suitable charging port in compliance with CCS, CHAdeMO, Guobiao recommended-standard 20234, Tesla Supercharger, and/or other EVSE standards. The electrically powered accessory 340 can be the electrically powered accessory 240 of FIG. 2. The accessory RESS 341 can be the accessory RESS 241 of FIG. 2. The accessory PDU 310 can also control the AC power source 312 to distribute electrical power received from the AC power source 312 to the vehicle through the standard charging port 313, to the electrically powered accessory 340, and/or to the accessory RESS 341. It will be appreciated that in one embodiment, the accessory PDU 310 can include a standard charging port (a charging plug), and that the accessory PDU 310 can interface to the charging port without rewiring.

The accessory RESS 341 can be controlled (e.g., by the controller of the accessory PDU 310) to supply electrical power to the electrically powered accessory 340.

The ESE can be configured to lock and monitor (e.g., prevent movement of) the vehicle and/or the electrically powered accessory 340 via the accessory PDU 310 through e.g., the PP line of the enhanced charging port 311.

The accessory PDU 310 can monitor the maximum and/or minimum allowable charging current and/or voltage from the ESE and/or the AC power source 312, to distribute power from the ESE and/or the AC power source 312 to the vehicle, the electrically powered accessory 340, and/or the accessory RESS 341, based on the priority level of the power demand/request from the vehicle (and/or from a user), the electrically powered accessory 340, and/or the accessory RESS 341. For example, the accessory PDU 310 can include a parameter that sets the maximum allowable charging current. The electrically powered accessory 340 (when having a higher priority level power demand) can obtain power supply from e.g., the accessory PDU 310 when the vehicle is using power sources for operation (e.g., charging, driving, etc.). In the embodiment of FIG. 3A, the controller of the accessory PDU 310 can be the main/master controller (for the ESE 320) of the interface system 300.

In FIG. 3A, it is the accessory PDU 310 that controls the ESE to distribute power to the vehicle and/or to the electrically powered accessory 340, based on e.g., a priority level of the power demand from the vehicle and/or a priority level of the power demand from the electrically powered accessory 340. In FIG. 3B, it is the vehicle (e.g., PDU of the vehicle) that controls the ESE to charge the vehicle and/or to distribute power to the electrically powered accessory via e.g., ePTO. In FIG. 3B, the vehicle (not shown, e.g., the vehicle 230 of FIG. 2) can connect to and/or communicate with the ESE 320, through the standard charging port 313, via the vehicle PDU 335. In some embodiments, the ESE 320 can be the ESE 220 of FIG. 2. In some embodiments, the vehicle PDU 335 can be the vehicle PDU 235 of FIG. 2.

In the embodiment of FIG. 3B, the ESE 320 can be configured to supply electrical power (or energy) for charging the vehicle (e.g., a vehicle electrical system of the vehicle) via the standard charging port 313. The electric power supplied from the ESE 320 can include alternating current (AC) and/or direct current (DC) power. The AC power can be single-phase AC or three phase AC power. The DC power can be Low Voltage (LV) DC power (e.g., Class A) and/or High Voltage (HV) DC power (e.g., Class B).

The PDU 335 can communicate with the ESE 320 using e.g., powerline communications, Pulse Width Modulation (PWM) communications, Local Interconnect Network (LIN) communications, Controller Area Network (CAN) communications, and/or Pilot signal analog feedback, etc. to support e.g., CCS, CHAdeMO, Guobiao recommended-standard 20234, Tesla Supercharger, and/or other EVSE standards.

The communications between the PDU 335 and the ESE 320 include e.g., a CP line and a PP line. The CP line can be used e.g., by the PDU 335 to indicate e.g., the charging level(s) of e.g., the vehicle, to initiate charging, and/or to communicate other information to the ESE 320. The ESE 320 can use the CP line to detect e.g., the presence of the vehicle, to communicate e.g., the maximum and/or minimum allowable charging current and/or voltage to the PDU 335, and/or to control e.g., the charging current and/or voltage, and/or to control the beginning and/or ending of charging. The PP line can be used (e.g., between the ESE 320 and a vehicle controller) to prevent movement of the vehicle and to indicate e.g., the latch release button to the vehicle.

The vehicle PDU 335 can communicate with a controller (not shown, e.g., the controller 215 of FIG. 2) of the accessory PDU 310. The controller of the accessory PDU 310 can determine the status (e.g., status of the sensors (e.g., temperature, location, pressure, voltage, current, battery status, and/or battery charging level sensor, etc.) and/or charge status) of the electrically powered accessory 340 and/or the accessory RESS 341. The sensors can sense e.g., an ambient temperature, a temperature of a climate controlled space of the electrically powered accessory, a temperature of the accessory RESS, a location of the electrically powered accessory, an ambient pressure, discharge/suction pressure of a compressor of the electrically powered accessory, voltage/current of an electrically powered accessory circuit, a charging level of the accessory RESS, etc.

It will be appreciated that power demand/request from the electrically powered accessory 340 and/or the accessory RESS 341 (e.g., for powering the transport climate control system to keep the cargo (e.g., produce, frozen foods, pharmaceuticals, etc.) safe and/or fresh) can have higher priority level than power demand/request from the vehicle (e.g., for charging the vehicle). As such, controller of the accessory PDU 310 can request an electric power take-off (ePTO) to be enabled by the vehicle PDU 335, based on the priority level of the power demand/request from the electrically powered accessory 340 and/or the accessory RESS 341 (e.g., when such priority level is higher than the priority level of the power demand from the vehicle). ePTO can be defined as e.g., taking electrical power from a power source and transmitting the electrical power to an application such as an attached implement or separate machines, via electric mechanisms.

In the embodiment of FIG. 3B, the controller of the PDU 335 can be the main/master controller (for the ESE 320) of the interface system 301. If ePTO is enabled, when for e.g., the vehicle is charging by the ESE 320 via the standard charging port 313, the power (a portion or all) from the ESE 320 can be taken and transmitted to the electrically powered accessory 340 and/or the accessory RESS 341, via the accessory PDU 310. The ePTO can be disabled by the PDU 335 if there is no power demand/request from the electrically powered accessory 340 and/or the accessory RESS 341, and/or the priority level of the power demand/request from the electrically powered accessory 340 and/or the accessory RESS 341 is not higher than the priority level of the power demand from the vehicle.

The accessory PDU 310 can connect to and/or communicate with an AC power source 360. The AC power source 360 can be the power source 250, the utility power source 260, the marine and/or ferry power source 270, the power source 280, and/or the auxiliary RESS 243 of FIG. 2 or any other suitable power source.

The accessory PDU 310 can connect to and/or communicate with another ESE 395. The ESE 395 can be the ESE 220 of FIG. 2. The accessory PDU 310 can control the ESE 395 and/or the AC power source 360 to distribute electrical power received from the ESE 395 and/or the AC power source 312 to the electrically powered accessory 340 and/or to the accessory RESS 341. The accessory PDU 310 can also control the electrically powered accessory 340 to distribute electrical power to the accessory RESS 341 (e.g., charging the accessory RESS 341), and/or control the accessory RESS 341 to distribute electrical power to the electrically powered accessory 340 (e.g., operating/running the electrically powered accessory 340).

In FIG. 3C, the interface system 302 is similar to the interface systems 300 and 301, except that the interface system 302 does not have a vehicle involved. It will be appreciated that in the embodiments of FIGS. 3A-3C, the accessory PDU 310 can be treated as a vehicle by the ESE (e.g., the ESE (not shown) of FIG. 3A, the ESE 395 of FIG. 3B, and/or the ESE 320 of FIG. 3C). It will be appreciated that the interface systems 300-302 can also include a user interface device (not shown, e.g., the user interface device of the interface system 200 of FIG. 2). Accordingly, the accessory PDU 310 can supply power from the first EVSE 320 and/or the AC power source 360 to power/charge the electrically powered accessory 340 and/or the accessory RESS 341.

Figure 4A:
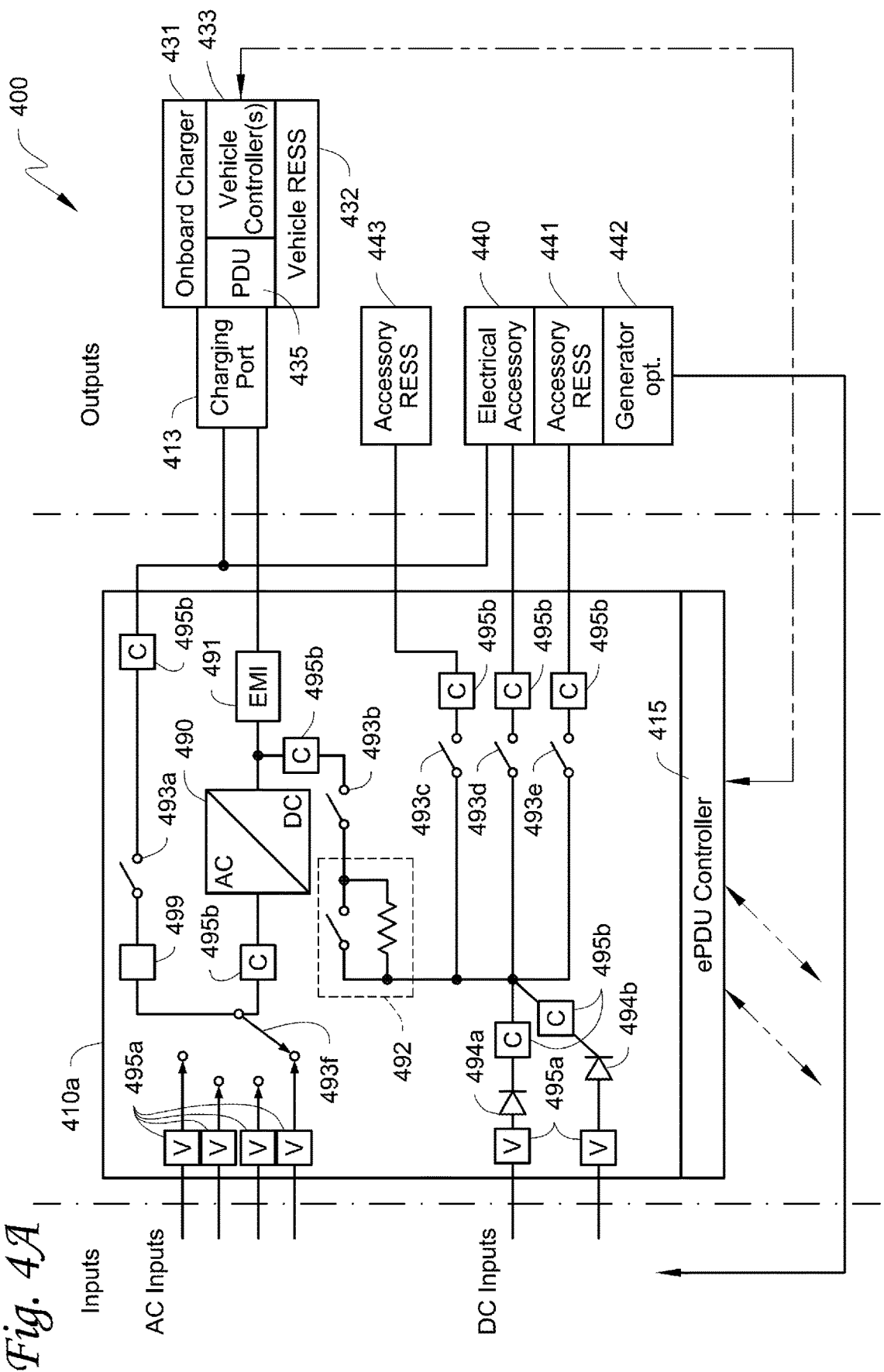
FIG. 4A is a schematic illustration of an internal configuration of an accessory PDU and an interface of the accessory PDU, power sources, a vehicle and an electrically powered accessory configured to be used with at least one of a vehicle, trailer, and a transport container, according to a first embodiment.
Figure 4B:
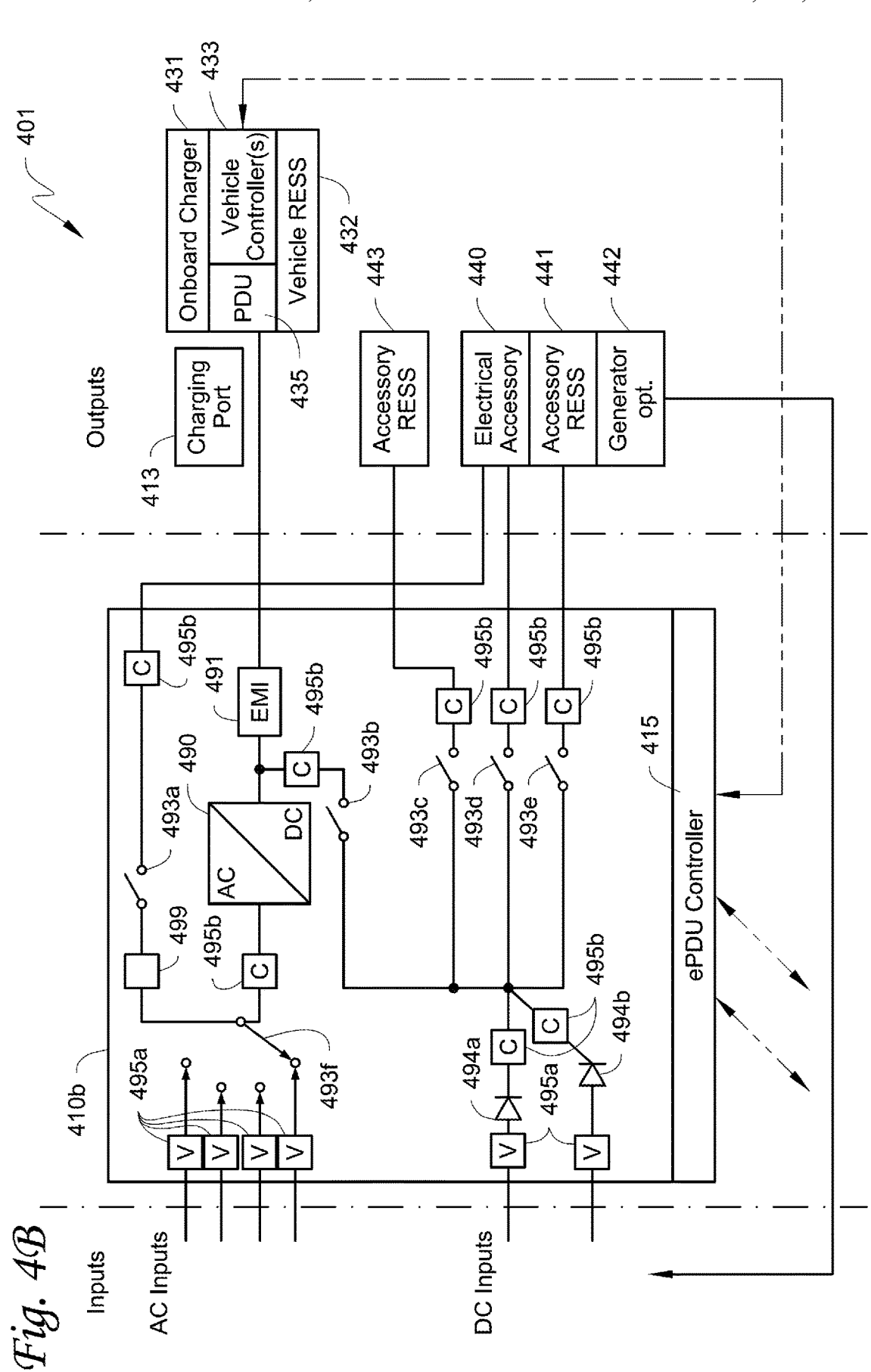
FIG. 4B is a schematic illustration of an internal configuration of an accessory PDU and an interface of the accessory PDU, power sources, a vehicle and an electrically powered accessory configured to be used with at least one of a vehicle, trailer, and a transport container, according to a second embodiment.

FIG. 4A is a schematic illustration of an internal configuration of an accessory PDU and an interface 400 of the accessory PDU, power sources, a vehicle and an electrically powered accessory configured to be used with at least one of a vehicle, trailer, and a transport container, according to a first embodiment. FIG. 4B is a schematic illustration of an internal configuration of an accessory PDU and an interface 401 of the accessory PDU, power sources, a vehicle and an electrically powered accessory configured to be used with at least one of a vehicle, trailer, and a transport container, according to a second embodiment.

As shown in FIG. 4A, the accessory PDU 410a can receive AC and/or DC power from various power sources (e.g., the ESE 220, the power source 250, the utility power source 260, the marine and/or ferry power source 270, the power source 280, and/or the auxiliary RESS 243 of FIG. 2 or any other suitable power source). The accessory PDU 410a can also distribute the AC and/or DC power received from the power sources to one or more of the vehicle (including an OnBoard charger 431, a vehicle PDU 435, at least one controller 433, and a vehicle RESS 432), the auxiliary RESS 443, the electrically powered accessory 440, and/or the accessory RESS 441. The power can be distributed to the vehicle via the standard charging port 413.

The standard charging port 413 can be the standard charging port 313 of FIGS. 3A and 3B. The vehicle can be the vehicle 230 of FIG. 2. The auxiliary RESS 443 can be the auxiliary RESS 243 of FIG. 2. The electrically powered accessory 440 can be the electrically powered accessory 240 of FIG. 2. The accessory RESS 441 can be the accessory RESS 241 of FIG. 2. The at least one controller 433 can be a part of the PDU 435.

The electrically powered accessory 440 can have a generator 442. The generator 442 can generate AC or DC power, which can be distributed to the accessory PDU 410a as an AC or DC power input. It will be appreciated that an electrically powered accessory (e.g., a hybrid TRU) can have a generator. The electrical accessory with generator can also contain an engine providing energy to the generator. The engine (e.g., gas/diesel/compressed natural gas engine, etc.) can be as part of the hybrid TRU and/or another power source. The power from the generator can be DC power as the generator can be paired with an inverter in order to control operation of the generator to load engine appropriately. In one embodiment there can be no inverter paired with the generator, and the accessory PDU can match the AC output of the generator to the load on the electrical accessory or on the vehicle. In one embodiment with an AC/DC power converter, the converter can be used to transform the power from the generator to the vehicle load (e.g., OnBoard charger).

The accessory PDU 410a includes a controller 415. The controller 415 can be the controller 215 of FIG. 2. The accessory PDU 410a also includes sensors 495a (e.g., voltage sensors) and/or 495b (e.g., current sensors). It will be appreciated that in one embodiment, each circuit branch can have a voltage sensor and/or a current sensor. In one embodiment, the sensors 495a and/or 495b can be e.g., temperature, location, pressure, voltage, current, battery status, and/or battery charging level sensor, etc. The sensors can sense e.g., an ambient temperature, a temperature of a climate controlled space of the electrically powered accessory, a temperature of the accessory RESS, a location of the electrically powered accessory, an ambient pressure, discharge/suction pressure of a compressor of the electrically powered accessory, voltage/current of an electrically powered accessory circuit, a charging level of the accessory RESS, etc. It will be appreciated that voltage sensor(s) can be used (e.g., by the accessory PDU) to match power supply to load to e.g., ensure that appropriate voltage, one which fits in load operational window, can be supplied to the load. The voltage and/or current sensor(s) can be used to detect frequencies. The voltage sensor(s) can also be used to detect electrical phase sequence (for three-phase), phase count (for single- or three-phase), presence of electrical neutral, etc. In one embodiment, the sensors 495a and/or 495b can be wattmeter(s). It will be appreciated that a wattmeter is an instrument for measuring the electrical power (or the supply rate of electrical power) in watts of a given circuit. It will be appreciated that wattmeter can be calculated (e.g., by a controller) from sensed voltage and/or current. The sensors 495a and/or 495b can used for power monitoring and power balancing by e.g., the controller 415. The sensed data can allow for analysis, along with e.g., communications, of which power sources is available. Also, the sensed data can facilitate quick disconnect and/or other diagnostic actions if an issue is detected to protect vehicle and/or electrically powered accessory 440.

For example, the controller 415 can communicate (e.g., with the sensors and/or with a user (driver, operator, etc.) via a user interface) via a communications link (wired or wireless), and/or can display diagnostic information (e.g., sensed status of components) via diagnostic light(s) (e.g., light-emitting diode(s)). The controller 415 can obtain sensed information from e.g., the voltage and/or current sensor(s) to determine e.g., whether the vehicle, the accessory, the EVSE, and/or the AC power source, etc. are functioning. For example, a computer running service diagnostic tests can connect (e.g., via the communication link) to the accessory PDU and set the accessory PDU in an AC power check mode. The AC power inputs status (e.g., sensed voltage, current, type, phase, etc.) can be sent from the accessory PDU to the computer and displayed as diagnostic feedback so that the user (e.g., technician) can check whether the connection is connected properly to aid in diagnoses. Another example is that when the accessory PDU determines that a voltage and current are being supplied to the electrical accessory (such as a TRU) based on the sensed voltage/current, if the TRU is not operating and has fault code then the user can determine that the fault is within the TRU and not the vehicle or AC supply (as the accessory PDU has determined that the power is supplying properly). It will be appreciated that for HV connection, voltage/current/shielding status can help diagnostics. If a user (e.g., technician) can obtain the voltage/current/shielding status (e.g., via the sensors) of the high voltage connections to the accessory PDU and/or other components, the user can easily diagnose where the failure in the HV connection is.

The accessory PDU 410a further includes switches 493a-493f. The switches 493a-493f can be a Metal-Oxide-Semiconductor Field-Effect Transistor (MOSFET), an Insulated Gate Bipolar Transistor (IGBT), a Bipolar Junction Transistor (BJT), a relay, a contactor, a solid-state switch such as a Triac (which is a part of the Silicon Controlled Rectifier (SCR) family but unlike an SCR, the Triac is a device that can conduct in both directions; the Triac can be used to easily turn on/off AC sources) or any suitable switch. The switches 493a-493f can enable the power flow for certain AC or DC inputs to a common bus and from the common bus to the different outputs. In some embodiments, the switches 493a-493f can be e.g., a high voltage relay or solid state switch. In some embodiments, the switches 493a-493f can be included inside power converters to save cost. In one embodiment, the switch 493f can have multiple inputs and one output. As such, the switch 493f can selectively connect to any one of the multiple AC power sources to distribute power from the selected AC power source to the output of the switch 493f. The output of the switch 493f is connected to an electrical phase sequence detection/correction module 499, the switch 493a, and the AC to DC converter 490. The electrical phase sequence detection/correction module 499 can be used (for e.g., three-phase power source) to detect the sequence of the three-phase input power source and to ensure that proper phase sequence (A, B, C) can be delivered to the load or accessory. The switch 493a can be a bypass switch to distribute power from the input of the switch 493a to the output of the switch 493a, when the switch 493a is closed (connected). When the switch 493a is closed, the AC power from the output of the switch 493f bypasses the AC to DC converter 490 and is distributed to the output of the switch 493a. The switch 493a can connect to the standard charging port 413 and/or the electrically powered accessory 440.

It will be appreciated that the controller 415 can be configured to monitor the operation of the accessory PDU 410a and/or to control the bypass switch (e.g., 493a) to ensure that the input power supply and the load match electrical parameters (e.g., voltage, current, frequency, etc.). The load parameters and power source parameters can be sent to the memory of the controller 415 and the controller 415 can determine whether the bypass mode (e.g., turn on/close the bypass switch 493a) is permitted based on the stored parameters. For example, the parameters can include voltage(s) sensed by e.g., voltage sensor(s) in the accessory PDU 410a, and the controller can determine whether it is appropriate to connect the input power supply directly to the load (or to the converter 490 or not connect to the load at all). The parameters can obe derived from the controller communicating with the power supply (such as the EVSE). For example, with a modified cable, a programmed parameter can be added to the accessory PDU 410a so that the power from the EVSE can match with a list of loads.

The AC to DC converter 490 can be a rectifier. In one embodiment, the AC to DC converter 490 can be an ACPM active rectifier, with boost power factor correction/controller (PFC). In one embodiment, the AC to DC converter 490 can be a bidirectional converter to allow power flow from/to a power input of the converter 490 to/from a power output of the converter 490. The sensors 495a and/or 495b can be configured to sense e.g., the current, voltage, and/or power of the AC power inputted to the AC to DC converter 490. The output of the AC to DC converter 490 connects to an Electromagnetic interference (EMI) filter 491. The EMI filter 491 can be configured to suppress EMI on power lines or in electronic circuits. The EMI filter 491 can connect to the standard charging port 413.

Also the accessory PDU 410a includes diodes (494a, 494b). The diodes (494a, 494b) can help to prevent improper direction of power flow (electrical current), e.g., to prevent back-feeding of power supplies. It will be appreciated that multiple DC power sources can be "OR-ed" together by using the diode(s). "Diode OR" is a term of art for power supply design, which typically indicates that multiple power sources can be brought to a common bus with diode(s), each power source can contribute current based on e.g., the voltage of the power source, and the back-feeding (or back-powering) of the power sources can be prevented with the blocking element such as the diode. Each of the DC power sources connects to a diode (494a, 494b). The sensors 495a and/or 495b can be configured to sense e.g., the current, voltage, and/or power of the DC power inputted to the diodes 494a and 494b, respectively. The DC power outputted from the diodes (494a, 494b) can be connect to the electrically powered accessory 440 via switch 493d, to the accessory RESS 441 via switch 493e, and/or to the auxiliary RESS 443 via the switch 493c. The DC power outputted from the diodes (494a, 494b) can also be connect to a converter 492. In one embodiment, the converter 492 can be a bi-directional converter to allow power flow from/to a power input of the converter 492 to/from a power output of the converter 492. In one embodiment, the converter 492 can be a bi-directional power converter to allow balancing power (e.g., voltage and/or current, to e.g., balance charging level between vehicle RESS and accessory RESS, etc.). See, for example, U.S. patent application Ser. No. 15/921,977 and U.S. Pat. No. 8,441,228 (which are incorporated by reference in their entirety) for a description of a bi-directional power converter. The converter 492 connects to the switch 493b, which connects to the EMI filter 491. The converter 492 can help to interface the power network of the electrically powered accessory 440 with the power source network of the accessory PDU 410a, and balance power. The converter 492 can help to enable the transfer of power from one energy storage to another using a bi-directional converter (e.g., a buck/boost converter). The converter 492 can boost (or step up) voltage or buck (or step-down) voltage to ensure that the amount of current is controlled. The converter 492 can contain bypass switch(es) in case of failure of the converter 492 for emergency "limp-home" operations. The converter 492 can also contain switch(es) to choose which energy storage is to be used.

It will be appreciated that the controller 415 can control the on/off (close/open) of the switches 493a-e to distribute power, from one or more power inputs of the accessory PDU 410a, to one or more power outputs of the accessory PDU 410a. The controller 415 can also control the switch 493f to select one of the AC power inputs to distribute power to the output of the switch 493f. The controller 415 can further control the converter 492 (e.g., the on/off (close/open) of the switch of the converter 492) to convert and/or distribute power. Also the controller 415 can control the sensors 495a and/or 495b to sense and obtain the sensed data. The controller 415 can communicate with the controller 433. In the embodiment of FIG. 4A, the controller 415 is the main/master controller (for an ESE), and the controller 433 is the secondary/slave controller (for an ESE).

It will also be appreciated that the controller 415 can communicate with an ESE (e.g., the ESE 220 of FIG. 2), and the communication/control includes High Voltage Inter-lock (HVIL). HVIL can be a safe design method for monitoring the integrity of high voltage circuits with low voltage signals. Typically the monitoring target can be an electrical interface component such as a high voltage connector that requires manual operation to turn the circuit on or off. In the high-voltage circuit of electric vehicles, the electrical components requiring HVIL can be high-voltage connectors and manual maintenance switches (MSD). The controller 415 can also control the lock (or interlock) of the vehicle and/or the electrically powered accessory 440 that can prevent the vehicle and/or the electrically powered accessory 440 from moving, for example, when the accessory PDU 410a is connected to an ESE. The controller 415 can further control e.g., the ignition line, the parking brake signal, the traction drive disable/enable, etc. of the vehicle and/or the electrically powered accessory 440.

FIG. 4A describes an embodiment similar to the embodiment of FIG. 3A. FIG. 4B describes an embodiment similar to the embodiment of FIG. 3B. In FIGS. 3A and 4A, it is the accessory PDU that controls the input energy sources to distribute power to the vehicle and/or to the electrically powered accessory, based on e.g., a priority level of the power demand from the vehicle and/or a priority level of the power demand from the electrically powered accessory. In FIGS. 3B and 4B, it is the vehicle (e.g., the PDU and/or the vehicle controller of the vehicle) that controls the input energy sources to charge the vehicle and/or to distribute power to the electrically powered accessory via e.g., ePTO. The differences between FIG. 4A and FIG. 4B are described below.

In FIG. 4B, the switch 493a can only connect to the electrically powered accessory 440. The EMI filter 491 can connect to the PDU 435 instead of the standard charging port 413. In FIG. 4B, there is no converter 492. The DC power outputted from the diodes (494a, 494b) can be connect to the switch 493b directly. In the embodiment of FIG. 4B, the controller 433 is the main/master controller (for an ESE), and the controller 415 is the secondary/slave controller (for an ESE). The controller 433 can communicate with an ESE (e.g., the ESE 220 of FIG. 2), and the communication/control includes HVIL and lock (or interlock) of the vehicle and/or the electrically powered accessory 440 that can prevent the vehicle and/or the electrically powered accessory 440 from moving, for example, when the vehicle is connected to an ESE. The controller 433 can further control e.g., the ignition line, the parking brake signal, the traction drive disable/enable, etc. of the vehicle and/or the electrically powered accessory 440.

Figure 5B:
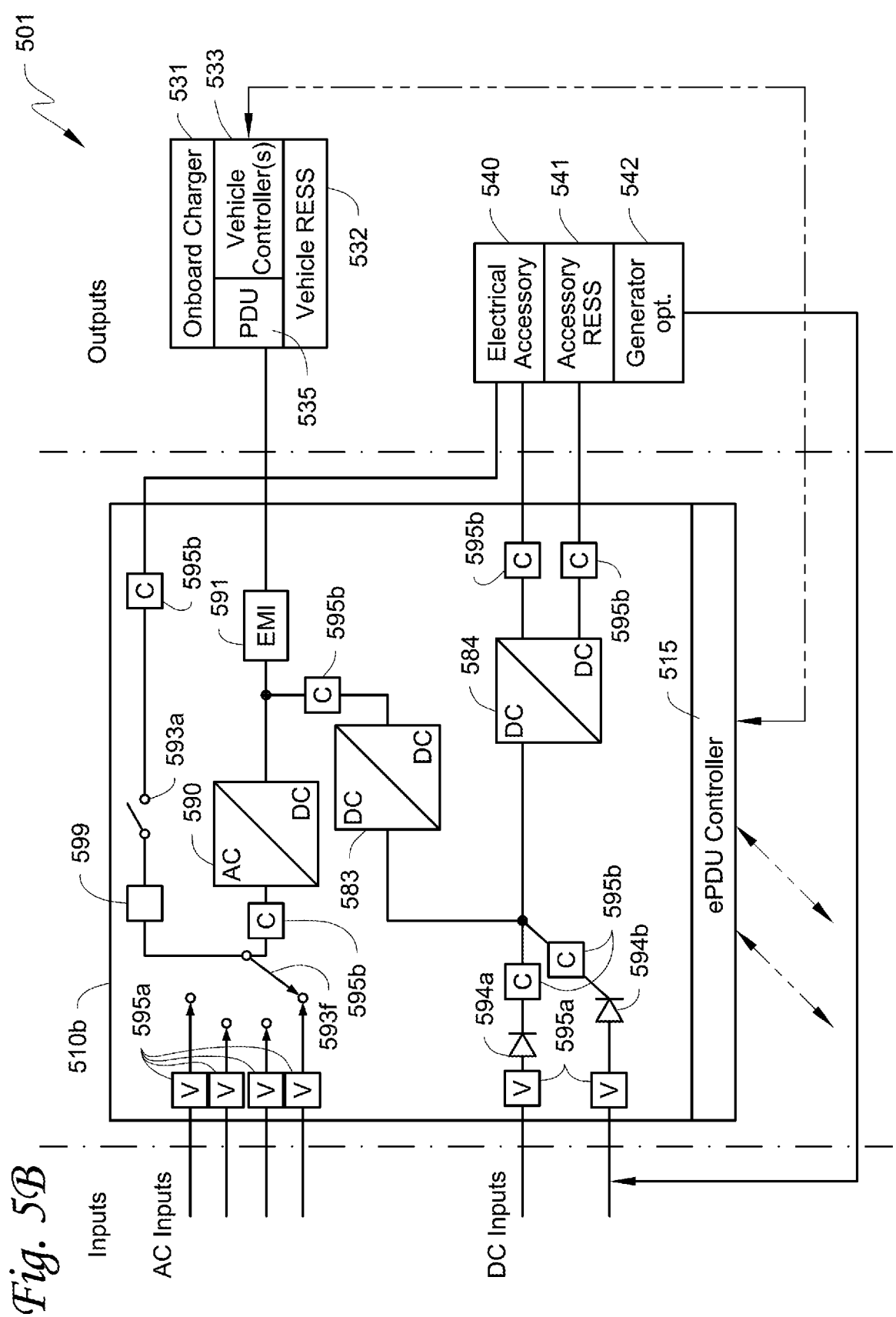
FIG. 5B is a schematic illustration of an internal configuration of an accessory PDU and an interface of the accessory PDU, power sources, a vehicle and an electrically powered accessory configured to be used with at least one of a vehicle, trailer, and a transport container, according to a fourth embodiment.

FIG. 5A is a schematic illustration of an internal configuration of an accessory PDU and an interface 500 of the accessory PDU, power sources, a vehicle and an electrically powered accessory configured to be used with at least one of a vehicle, trailer, and a transport container, according to a third embodiment. FIG. 5B is a schematic illustration of an internal configuration of an accessory PDU and an interface 501 of the accessory PDU, power sources, a vehicle and an electrically powered accessory configured to be used with at least one of a vehicle, trailer, and a transport container, according to a fourth embodiment.

FIG. 5A describes an embodiment similar to the embodiment of FIG. 4A. FIG. 5B describes an embodiment similar to the embodiment of FIG. 4B. In FIGS. 5A and 4A, it is the accessory PDU that controls the input energy sources to distribute power to the vehicle and/or to the electrically powered accessory, based on e.g., a priority level of the power demand from the vehicle and/or a priority level of the power demand from the electrically powered accessory. In FIGS. 5B and 4B, it is the vehicle (e.g., the PDU and/or the vehicle controller of the vehicle) that controls the input energy sources to charge the vehicle and/or to distribute power to the electrically powered accessory via e.g., ePTO. It will be appreciated that in one embodiment, each circuit branch can have sensor(s) (e.g., a voltage sensor 595a and/or a current sensor 595b). The electrical phase sequence detection/correction module 599 can be used (for e.g., three-phase power source) to detect the sequence of the three-phase input power source and to ensure that proper phase sequence can be delivered to the load or accessory. The differences between FIG. 5A and FIG. 4A are described below.

The switch 593a can connect to the OnBoard charger 531 instead of a standard charging port. The output of the EMI filter 591 can connect to the PDU 535 (for power distribution) instead of the standard charging port. The DC power outputted from the diodes (594a, 594b) can be connect to a DC to DC boost/buck converter 583 instead of to a converter and then a switch, before connecting to the EMI filter 591. The DC to DC converter 583 can be bidirectional to allow power flow from/to a power input of the converter 583 to/from a power output of the converter 583. The DC power outputted from the diodes (594a, 594b) can also be connect to a DC to DC boost/buck converter 584 instead of switches before connecting to the auxiliary RESS 543, the electrically powered accessory 540, and/or the accessory RESS 541. The DC to DC converter 584 can be bidirectional to allow power flow from/to a power input of the converter 584 to/from a power output of the converter 584. The generator 542 can generate DC power, which can be distributed to the accessory PDU 510a as a DC power input. It will be appreciated that the converters (583, 584) can help to control power delivery, which may need to step-up (boost) or step-down (buck) the voltage in either direction. The converters (583, 584) can help to manage the amount of current flow and direction, regardless the voltage being boosted/bucked or not. The converters (583, 584) can have an energy storage element (e.g., an inductor or a capacitor), which can be switched in or out.

The differences between FIG. 5B and FIG. 4B are described below. The DC power outputted from the diodes (594a, 594b) can be connect to a DC to DC boost/buck converter 583 instead of to a converter and then a switch, before connecting to the EMI filter 591. The DC power outputted from the diodes (594a, 594b) can also be connect to a DC to DC boost/buck converter 584 instead of switches before connecting to the auxiliary RESS 543, the electrically powered accessory 540, and/or the accessory RESS 541.

In FIGS. 5A and 5B, the accessory PDUs 510a and 510b include a converter 590. The converter 590 can be bidirectional to allow power flow from/to a power input of the converter 590 to/from a power output of the converter 590. The converter 590 can be a full power converter (e.g., an ACPM active rectifier with PFC), which can serve as an isolation between the inputs and outputs of the accessory PDUs 510a and 510b. The isolation can help to prevent damage from different electrical references in the interface systems, and allow for disconnection of power sources and loads during fault conditions. The converter 590 can have a higher performance than a standard rectifier, and can converter AC power to DC and balance the power before supplying power to the outputs.

It will be appreciated that the accessory PDUs 510a and 510b can be in a service mode, where power management/control functionality of the accessory PDUs 510a and 510b is disabled, and the electrically powered accessory 540 is powered from any available power source (e.g., a spare battery pack or Genset from a service truck). The service mode can help in field/dealer troubleshooting, and can provide power for troubleshooting in a safe manner.

Aspects

It is to be appreciated that any of aspects 1-9 can be combined with any of aspects 10-16, and any of aspects 17-25 can be combined with any of aspects 26-32.

Aspect 1. A power distribution unit for use with an electrically powered accessory, the electrically powered accessory configured to be used with at least one of a vehicle, a trailer, and a transportation container, the power distribution unit comprising:
 at least one power input configured to receive electrical power from at least one of an electrical supply equipment and a second power source;
 an accessory power interface configured to provide electrical power to the electrically powered accessory;
 a vehicle power interface configured to provide electrical power to a vehicle electrical system of the vehicle, the vehicle electrical system having a vehicle electrical storage device;
 at least one switch or at least one converter configured to selectively connect the at least one power input to a power bus, and selectively connect the power bus to at least one of the accessory power interface and the vehicle power interface; and
 a controller configured to control the at least one switch or the at least one converter to provide electrical power to at least one of the electrically powered accessory and the vehicle electrical storage device.

Aspect 2. The power distribution unit of aspect 1, further comprising:
 at least one sensor,
 wherein the at least one sensor is configured to sense a first electrical power demand from the electrically powered accessory and a second electrical power demand from the vehicle electrical system,
 the controller is configured to determine an electrical power priority level based on the first electrical power demand and the second electrical power demand,
 the controller is further configured to control the at least one switch or the at least one converter to provide electrical power to the electrically powered accessory and the vehicle electrical storage device, based on the electrical power priority level.

Aspect 3. The power distribution unit of aspect 1 or aspect 2, further comprising:
 a bi-directional electrical power converter;
 an auxiliary battery; and
 a rechargeable energy storage system (RESS),
 wherein the controller is configured to control the bi-directional electrical power converter to balance electrical power among the electrically powered accessory, the auxiliary battery, and the RESS.

Aspect 4. The power distribution unit of any one of aspects 1-3, wherein the second power source includes at least one of an AC utility power, a vehicle export AC power, a vehicle export DC power, and a solar DC power.

Aspect 5. The power distribution unit of aspect 4, further comprising:
 an AC power module configured to receive an AC input from the second power source and convert the AC input to a DC power to feed a DC link,
 wherein the AC input is a single-phase AC power or a three-phase AC power.

Aspect 6. The power distribution unit of any one of aspects 1-5, wherein the electrical supply equipment includes at least one of an AC power and a DC power.

Aspect 7. The power distribution unit of any one of aspects 1-6, wherein the controller is further configured to communicate with the electrical supply equipment to support delivery of a Class B DC power.

Aspect 8. The power distribution unit of any one of aspects 1-7, wherein the electrically powered accessory includes a DC transport refrigeration unit (TRU), a DC battery charger for an auxiliary battery, an accessory AC network, and/or an accessory DC network.

Aspect 9. The power distribution unit of any one of aspects 1-8, wherein the vehicle electrical system includes a DC vehicle electrical system, and/or an electrical system using an OnBoard charger to perform AC to DC conversion.

Aspect 10. The power distribution unit of any one of aspects 1-9, further comprising:
  a bypass switch,
  wherein the second power source is an AC power source,
  when a voltage of the second power source matches a voltage of the transport climate control system or a voltage of an OnBoard charger of the vehicle electrical system, the controller is configured to turn on the bypass switch to provide electrical power from the second power source directly to the transport climate control system or to the OnBoard charger.

Aspect 11. A power distribution unit for an electrically powered accessory, the electrically powered accessory configured to be used with at least one of a vehicle, a trailer, and a transportation container, the power distribution unit comprising:
  at least one power input configured to receive electrical power from at least one of an electric power take off (ePTO) of a vehicle electrical system and a second power source, the vehicle electrical system being configured to receive electrical power from an electrical supply equipment and store power in a vehicle electrical storage device;
  an electrical power interface configured to provide power to the electrically powered accessory;
  at least one switch or at least one converter configured to selectively connect the at least one power input to a power bus, and selectively connect the power bus to the electrical power interface; and
  a controller configured to control the at least one switch or the at least one converter to distribute the power received from the at least one power input, to the electrically powered accessory.

Aspect 12. The power distribution unit of aspect 11, wherein the second power source includes at least one of an AC utility power, a vehicle export AC power, a vehicle export DC power, and a solar DC power.

Aspect 13. The power distribution unit of aspect 12, further comprising:
  an AC power module configured to receive an AC input from the second power source and convert the AC input to a DC power to feed a DC link,
  wherein the AC input is a single-phase AC power or a three-phase AC power.

Aspect 14. The power distribution unit of any one of aspects 11-13, wherein the electrical supply equipment includes at least one of an AC power and a DC power.

Aspect 15. The power distribution unit of any one of aspects 11-14, wherein the vehicle electrical system is configured to communicate with the electrical supply equipment to support delivery of a Class B DC power.

Aspect 16. The power distribution unit of any one of aspects 11-15, wherein the electrically powered accessory includes a DC transport refrigeration unit (TRU), a DC battery charger for an auxiliary battery, an accessory AC network, and/or an accessory DC network.

Aspect 17. The power distribution unit of any one of aspects 11-16, wherein the vehicle electrical system includes a DC vehicle electrical system, and/or an electrical system using an OnBoard charger to perform AC to DC conversion.

Aspect 18. A power distribution unit for use with a transport climate control system, the power distribution unit comprising:
  at least one power input configured to receive electrical power from at least one of an electrical supply equipment and a second power source;
  an accessory power interface configured to provide electrical power to the transport climate control system;
  a vehicle power interface configured to provide electrical power to a vehicle electrical system of the vehicle, the vehicle electrical system having a vehicle electrical storage device;
  at least one switch or at least one converter configured to selectively connect the at least one power input to a power bus, and selectively connect the power bus to at least one of the accessory power interface and the vehicle power interface; and
  a controller configured to control the at least one switch or the at least one converter to provide electrical power to at least one of the transport climate control system and the vehicle electrical storage device.

Aspect 19. The power distribution unit of aspect 18, further comprising:
  at least one sensor,
  wherein the at least one sensor is configured to sense a first electrical power demand from the transport climate control system and a second electrical power demand from the vehicle electrical system,
  the controller is configured to determine an electrical power priority level based on the first electrical power demand and the second electrical power demand,
  the controller is further configured to control the at least one switch or the at least one converter to provide electrical power to the transport climate control system and the vehicle electrical storage device, based on the electrical power priority level.

Aspect 20. The power distribution unit of aspect 18 or aspect 19, further comprising:
  a bi-directional electrical power converter;
  an auxiliary battery; and
  a rechargeable energy storage system (RESS),
  wherein the controller is configured to control the bi-directional electrical power converter to balance electrical power among the transport climate control system, the auxiliary battery, and the RESS.

Aspect 21. The power distribution unit of any one of aspects 18-20, wherein the second power source includes at least one of an AC utility power, a vehicle export AC power, a vehicle export DC power, and a solar DC power.

Aspect 22. The power distribution unit of aspect 21, further comprising:
  an AC power module configured to receive an AC input from the second power source and convert the AC input to a DC power to feed a DC link,
  wherein the AC input is a single-phase AC power or a three-phase AC power.

Aspect 23. The power distribution unit of any one of aspects 18-22, wherein the electrical supply equipment includes at least one of an AC power and a DC power.

Aspect 24. The power distribution unit of any one of aspects 18-23, wherein the controller is further configured to communicate with the electrical supply equipment to support delivery of a Class B DC power.

Aspect 25. The power distribution unit of any one of aspects 18-24, wherein the transport climate control system includes a DC transport refrigeration unit (TRU), a DC battery charger for an auxiliary battery, an accessory AC network, and/or an accessory DC network.

Aspect 26. The power distribution unit of any one of aspects 18-25, wherein the vehicle electrical system includes a DC vehicle electrical system, and/or an electrical system using an OnBoard charger to perform AC to DC conversion.

Aspect 27. A power distribution unit for providing power to a transport climate control system, the power distribution unit comprising:
  at least one power input configured to receive electrical power from at least one of an electric power take off (ePTO) of a vehicle electrical system and a second power source, the vehicle electrical system being configured to receive electrical power from an electrical supply equipment and store power in a vehicle electrical storage device;
  an electrical power interface configured to provide power to the transport climate control system;
  at least one switch or at least one converter configured to selectively connect the at least one power input to a power bus, and selectively connect the power bus to the electrical power interface; and
  a controller configured to control the at least one switch or the at least one converter to distribute the power received from the at least one power input, to the transport climate control system.

Aspect 28. The power distribution unit of aspect 27, wherein the second power source includes at least one of an AC utility power, a vehicle export AC power, a vehicle export DC power, and a solar DC power.

Aspect 29. The power distribution unit of aspect 28, further comprising:
  an AC power module configured to receive an AC input from the second power source and convert the AC input to a DC power to feed a DC link,
  wherein the AC input is a single-phase AC power or a three-phase AC power.

Aspect 30. The power distribution unit of any one of aspects 27-29, wherein the electrical supply equipment includes at least one of an AC power and a DC power.

Aspect 31. The power distribution unit of any one of aspects 27-30, wherein the vehicle electrical system is configured to communicate with the electrical supply equipment to support delivery of a Class B DC power.

Aspect 32. The power distribution unit of any one of aspects 27-31, wherein the transport climate control system includes a DC transport refrigeration unit (TRU), a DC battery charger for an auxiliary battery, an accessory AC network, and/or an accessory DC network.

Aspect 33. The power distribution unit of any one of aspects 27-32, wherein the vehicle electrical system includes a DC vehicle electrical system, and/or an electrical system using an OnBoard charger to perform AC to DC conversion.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A power distribution unit for use with a transport climate control system, the power distribution unit comprising:
  a first interface communicating with an electrical supply equipment, the electrical supply equipment being an electric vehicle supply equipment;
  a second interface communicating with a second power source, the second power source being an AC power source;
  at least one power input configured to receive electrical power from at least one of the electrical supply equipment and the second power source;
  an accessory power interface configured to provide electrical power to the transport climate control system;
  a vehicle power interface configured to provide electrical power to a vehicle electrical system of a vehicle, the vehicle electrical system having a vehicle electrical storage device;
  at least one switch or at least one converter configured to selectively connect the at least one power input to a power bus, and selectively connect the power bus to at least one of the accessory power interface and the vehicle power interface;
  a controller configured to control the at least one switch or the at least one converter to provide electrical power to at least one of the transport climate control system and the vehicle electrical storage device;
  an AC to DC converter configured to selectively receive power from the second interface and provide DC power to at least one of the accessory power interface and the vehicle power interface; and
  a bypass switch connected between the second interface and at least one of the accessory power interface and the vehicle power interface;
  wherein the controller is configured to determine when a voltage of the second power source matches a voltage of the transport climate control system or a voltage of the vehicle electrical system and connect the bypass switch to bypass the AC to DC converter to provide electrical power from the second power source directly to the transport climate control system or to the vehicle electrical system.

2. The power distribution unit of claim 1, further comprising:
  at least one sensor,
  wherein the at least one sensor is configured to sense a first electrical power demand from the transport climate control system and a second electrical power demand from the vehicle electrical system,
  the controller is configured to determine an electrical power priority level based on the first electrical power demand and the second electrical power demand,
  the controller is further configured to control the at least one switch or the at least one converter to provide electrical power to the transport climate control system and the vehicle electrical storage device, based on the electrical power priority level.

3. The power distribution unit of claim 1, further comprising:
  a bi-directional electrical power converter;
  an auxiliary battery; and
  a rechargeable energy storage system (RESS), wherein the controller is configured to control the bi-directional electrical power converter to balance electrical power among the transport climate control system, the auxiliary battery, and the RESS.

4. The power distribution unit of claim 1, wherein the second power source includes at least one of an AC utility power and a vehicle export AC power.

5. The power distribution unit of claim 4, further comprising:
an AC power module comprising the AC to DC converter, configured to receive an AC input from the second power source and convert the AC input to a DC power to feed a DC link,
wherein the AC input is a single-phase AC power or a three-phase AC power.

6. The power distribution unit of claim 1, wherein electrical power received from the electrical supply equipment includes at least one of an AC power and a DC power.

7. The power distribution unit of claim 1, wherein the controller is further configured to communicate with the electrical supply equipment to support delivery of a Class B DC power.

8. The power distribution unit of claim 1, wherein the transport climate control system includes a DC transport refrigeration unit (TRU), a DC battery charger for an auxiliary battery, an accessory AC network, and/or an accessory DC network.

9. The power distribution unit of claim 1, wherein the vehicle electrical system includes a DC vehicle electrical system, and/or an electrical system using an OnBoard charger to perform AC to DC conversion.

10. The power distribution unit of claim 1, further comprising:
an electromagnetic interference filter connected in series with the AC to DC converter and configured to suppress electromagnetic interference on the power bus; and
a bi-directional electrical power converter connecting a DC power source to the electromagnetic interference filter.

11. A power distribution unit for providing power to a transport climate control system, the power distribution unit comprising:
a first interface communicating with an electrical supply equipment, the electrical supply equipment being an electric vehicle supply equipment;
a second interface communicating with a second power source, the second power source being an AC power source;
at least one power input configured to receive electrical power from at least one of an electric power take off (ePTO) of a vehicle electrical system and the second power source, the vehicle electrical system being configured to receive electrical power from the electrical supply equipment and store power in a vehicle electrical storage device;
an electrical power interface configured to provide power to the transport climate control system;
at least one switch or at least one converter configured to selectively connect the at least one power input to a power bus, and selectively connect the power bus to the electrical power interface;
a controller configured to control the at least one switch or the at least one converter to distribute the power received from the at least one power input, to the transport climate control system;
an AC to DC converter configured to selectively receive power from the second interface and provide DC power to at least one of the electrical power interface and the vehicle electrical system; and
a bypass switch connected between the second interface and at least one of the electrical power interface and the vehicle electrical system;
wherein the controller is configured to determine when a voltage of the second power source matches a voltage of the transport climate control system or a voltage of the vehicle electrical system and connect the bypass switch to bypass the AC to DC converter to provide electrical power from the second power source directly to the transport climate control system or to the vehicle electrical system.

12. The power distribution unit of claim 11, wherein the second power source includes at least one of an AC utility power and a vehicle export AC power.

13. The power distribution unit of claim 12, further comprising:
an AC power module comprising the AC to DC converter, configured to receive an AC input from the second power source and convert the AC input to a DC power to feed a DC link,
wherein the AC input is a single-phase AC power or a three-phase AC power.

14. The power distribution unit of claim 11, wherein electrical power received from the electrical supply equipment includes at least one of an AC power and a DC power.

15. The power distribution unit of claim 11, wherein the vehicle electrical system is configured to communicate with the electrical supply equipment to support delivery of a Class B DC power.

16. The power distribution unit of claim 11, wherein the transport climate control system includes a DC transport refrigeration unit (TRU), a DC battery charger for an auxiliary battery, an accessory AC network, and/or an accessory DC network.

17. The power distribution unit of claim 11, wherein the vehicle electrical system includes a DC vehicle electrical system, and/or an electrical system using an OnBoard charger to perform AC to DC conversion.

18. The power distribution unit of claim 11, further comprising:
at least one sensor,
wherein the at least one sensor is configured to sense a first electrical power demand from the transport climate control system and a second electrical power demand from the vehicle electrical system,
the controller is configured to determine an electrical power priority level based on the first electrical power demand and the second electrical power demand,
the controller is further configured to control the at least one switch or the at least one converter to provide electrical power to the transport climate control system and the vehicle electrical storage device, based on the electrical power priority level.

* * * * *